(12) United States Patent
Campbell et al.

(10) Patent No.: US 9,982,157 B2
(45) Date of Patent: May 29, 2018

(54) AQUEOUS LASER-SENSITIVE COMPOSITION FOR MARKING SUBSTRATES

(71) Applicant: DATALASE LTD., Cheshire (GB)

(72) Inventors: Jonathan Campbell, Riehen (CH); Adolf Kaser, Bottmingen (CH); Robert Montgomery O'Neil, Davyhulme Manchester (CH)

(73) Assignee: DATALASE LTD., Cheshire (GB)

( * ) Notice: Subject to any disclaimer, the term of this patent is extended or adjusted under 35 U.S.C. 154(b) by 0 days. days.

(21) Appl. No.: 14/836,772

(22) Filed: Aug. 26, 2015

(65) Prior Publication Data

US 2015/0361289 A1  Dec. 17, 2015

Related U.S. Application Data

(63) Continuation of application No. 13/123,607, filed as application No. PCT/EP2009/063520 on Oct. 16, 2009, now abandoned.

(30) Foreign Application Priority Data

Oct. 27, 2008 (EP) .................................... 08167676

(51) Int. Cl.
| | |
|---|---|
| *C08F 220/12* | (2006.01) |
| *C09D 133/02* | (2006.01) |
| *B41M 5/327* | (2006.01) |
| *B41M 5/333* | (2006.01) |
| *B41M 5/337* | (2006.01) |
| *C08K 5/1535* | (2006.01) |

(52) U.S. Cl.
CPC ......... *C09D 133/02* (2013.01); *B41M 5/3275* (2013.01); *B41M 5/3336* (2013.01); *B41M 5/3372* (2013.01); *C08F 220/12* (2013.01); *C08K 5/1535* (2013.01); *B41M 2205/04* (2013.01); *Y10T 428/24802* (2015.01)

(58) Field of Classification Search
CPC .................... B41M 5/3275; B41M 5/3335; B41M 5/3336; B41M 5/3372; C08F 220/12
USPC ..... 503/200–226; 106/31.14–31.59; 524/562
See application file for complete search history.

(56) References Cited

U.S. PATENT DOCUMENTS

| | | |
|---|---|---|
| 2,286,726 A | 6/1942 | Emerson |
| 3,161,770 A | 12/1964 | Huett et al. |
| 3,959,571 A | 5/1976 | Yahagi et al. |
| 4,157,982 A | 6/1979 | Clemons et al. |
| 4,446,324 A | 5/1984 | Graser |
| 4,623,557 A | 11/1986 | Yamori et al. |
| 4,680,598 A | 7/1987 | Obitsu et al. |
| 4,820,683 A | 4/1989 | Vervacke et al. |
| 4,861,620 A | 8/1989 | Azuma et al. |
| 4,981,675 A | 1/1991 | Haase et al. |
| 5,028,643 A | 7/1991 | Jaffe |
| 5,075,195 A | 12/1991 | Bäbler et al. |
| 5,166,350 A | 11/1992 | Bedekovic et al. |
| 5,171,624 A | 12/1992 | Walter |
| 5,329,006 A | 7/1994 | Baumann et al. |
| 5,354,633 A | 10/1994 | Lewis et al. |
| 5,380,694 A | 1/1995 | Krebs |
| 5,413,629 A | 5/1995 | Yasui et al. |
| 5,446,011 A | 8/1995 | Hayakawa et al. |
| 5,470,502 A | 11/1995 | Hahn et al. |
| 5,718,754 A | 2/1998 | Macpherson et al. |
| 5,721,190 A | 2/1998 | Miyamoto et al. |
| 5,733,414 A | 3/1998 | Stockwell |
| 5,879,855 A | 3/1999 | Schädeli et al. |
| 5,888,283 A | 3/1999 | Mehta et al. |
| 5,897,938 A | 4/1999 | Shinmoto et al. |
| 6,022,905 A | 2/2000 | Harris et al. |
| 6,054,021 A | 4/2000 | Kurrle et al. |
| 6,174,586 B1 | 1/2001 | Peterson |
| 6,210,472 B1 | 4/2001 | Kwan et al. |
| 6,274,065 B1 | 8/2001 | Deno et al. |
| 6,290,765 B1 | 9/2001 | Jaycock et al. |
| 6,306,493 B1 | 10/2001 | Brownfield |
| 6,335,783 B1 | 1/2002 | Kruit |
| 6,372,394 B1 | 4/2002 | Zientek |

(Continued)

FOREIGN PATENT DOCUMENTS

| | | |
|---|---|---|
| CN | 1537059 | 10/2004 |
| DE | 2130845 | 1/1972 |

(Continued)

OTHER PUBLICATIONS

Anklam, E., "A review of the analytical methods to determine the geographical and botanical origin of honey," Food Chemistry vol. 63, No. 4, pp. 549-562, (1998).

(Continued)

*Primary Examiner* — Bruce H Hess
(74) *Attorney, Agent, or Firm* — Stoel Rives LLP; Zhi-Xiang (Alex) Oh

(57) ABSTRACT

Aqueous composition comprising a color former, a developer, and a binder, wherein (a) the weight ratio between the developer and the color former is in the range of from 1 to 5; (b) the binder comprises an acrylate binder, comprising acrylic acid and styrene, and at least one additional monomer selected from the group consisting of α-methyl styrene, ethyl acrylate and 2-ethylhexyl acrylate; and (c) the color former and/or the developer are present in an un-encapsulated form; a process for the preparation of these compositions, substrates coated with this composition and a process for its preparation, and a process for preparing a marked substrate using this composition.

24 Claims, No Drawings

(56) References Cited

U.S. PATENT DOCUMENTS

| | | | |
|---|---|---|---|
| 6,372,819 B1 | 4/2002 | Mizobuchi et al. |
| 6,475,695 B2 | 11/2002 | Kuroki et al. |
| 6,596,386 B1 | 7/2003 | Reck et al. |
| 6,677,273 B2 | 1/2004 | Torii et al. |
| 6,706,785 B1 | 3/2004 | Fu |
| 6,906,735 B2 | 6/2005 | Bhatt et al. |
| 7,144,676 B2 | 12/2006 | Barr et al. |
| 7,597,961 B2 | 10/2009 | Maruvada et al. |
| 8,021,820 B2 | 9/2011 | O'Donoghue et al. |
| 8,101,544 B2 | 1/2012 | O'Donoghue et al. |
| 8,178,277 B2 | 5/2012 | Campbell et al. |
| 8,865,620 B2 | 10/2014 | Cunningham et al. |
| 8,900,414 B2 | 12/2014 | Kaser et al. |
| 9,045,619 B2 | 6/2015 | Campbell et al. |
| 2001/0006757 A1 | 7/2001 | Fukino et al. |
| 2002/0155291 A1 | 10/2002 | Daga et al. |
| 2003/0104938 A1 | 6/2003 | Torii et al. |
| 2003/0228439 A1 | 12/2003 | Kawakami |
| 2004/0106163 A1 | 6/2004 | Workman et al. |
| 2004/0157947 A1 | 8/2004 | Heneghan |
| 2004/0242414 A1 | 12/2004 | Morita et al. |
| 2005/0119368 A1 | 6/2005 | Hall-Goulle et al. |
| 2005/0148467 A1 | 7/2005 | Makitalo et al. |
| 2005/0186511 A1 | 8/2005 | Khan |
| 2006/0040217 A1 | 2/2006 | Stubbs |
| 2006/0072437 A1 | 4/2006 | Shiono et al. |
| 2006/0094599 A1 | 5/2006 | Kuboyama et al. |
| 2006/0147842 A1 | 7/2006 | Khan |
| 2006/0154818 A1 | 7/2006 | Destro et al. |
| 2006/0155007 A1 | 7/2006 | Huber |
| 2007/0082139 A1 | 4/2007 | Dermeik et al. |
| 2007/0087292 A1 | 4/2007 | Day et al. |
| 2007/0098900 A1 | 5/2007 | Abe et al. |
| 2007/0218206 A1 | 9/2007 | Reichert et al. |
| 2008/0023164 A1 | 1/2008 | Fredlund et al. |
| 2008/0124498 A1 | 5/2008 | Cole et al. |
| 2009/0107645 A1 | 4/2009 | Legnerfalt et al. |
| 2009/0220749 A1 | 9/2009 | O'Donoghue |
| 2010/0279079 A1 | 11/2010 | Campbell et al. |
| 2011/0183126 A1 | 7/2011 | Walker et al. |
| 2012/0045624 A1 | 2/2012 | Campbell et al. |

FOREIGN PATENT DOCUMENTS

| | | |
|---|---|---|
| DE | 1670332 | 3/1972 |
| DE | 4407905 | 9/1995 |
| DE | 19704478 | 8/1998 |
| EP | 0165608 | 12/1985 |
| EP | 0187329 | 7/1986 |
| EP | 0319283 | 6/1989 |
| EP | 0372715 | 6/1990 |
| EP | 0546577 | 6/1993 |
| EP | 0600441 | 6/1994 |
| EP | 0637514 | 2/1995 |
| EP | 0659583 | 6/1995 |
| EP | 0704437 | 4/1996 |
| EP | 0754564 | 1/1997 |
| EP | 0792756 | 9/1997 |
| EP | 0894896 | 2/1999 |
| EP | 0941989 | 9/1999 |
| EP | 0949251 | 10/1999 |
| EP | 1208995 | 5/2002 |
| EP | 1295730 | 3/2003 |
| EP | 1367437 | 12/2003 |
| EP | 1645430 | 4/2006 |
| GB | 1347647 | 2/1974 |
| GB | 1389716 | 4/1975 |
| GB | 2002801 | 2/1979 |
| GB | 1548059 | 7/1979 |
| GB | 2154597 | 9/1985 |
| JP | 61/022988 | 1/1986 |
| JP | 63/172689 | 7/1988 |
| JP | 1232093 | 9/1989 |
| JP | 02/044562 | 2/1990 |
| JP | 02293181 | 12/1990 |
| JP | 7017134 | 1/1995 |
| JP | 08267915 | 10/1996 |
| JP | 9/156228 | 6/1997 |
| JP | 10282657 | 10/1998 |
| JP | 2000/137320 | 5/2000 |
| JP | 2000/200830 | 7/2000 |
| JP | 2000/238237 | 9/2000 |
| JP | 2003/206405 | 7/2003 |
| JP | 2003-276334 | 9/2003 |
| JP | 2004/045549 | 2/2004 |
| JP | 2004/160806 | 6/2004 |
| JP | 2005/022366 | 1/2005 |
| JP | 2005/305872 | 11/2005 |
| JP | 2006/021500 | 1/2006 |
| JP | 2006/291082 | 10/2006 |
| JP | 2007/125578 | 5/2007 |
| JP | 2009/503170 | 1/2009 |
| WO | 97/10307 | 3/1997 |
| WO | 2000/35679 | 6/2000 |
| WO | 2002/068205 | 9/2002 |
| WO | 2002/074548 | 9/2002 |
| WO | 2002/100914 | 12/2002 |
| WO | 2004/043704 | 5/2004 |
| WO | 2005/012442 | 2/2005 |
| WO | 2005/054576 | 6/2005 |
| WO | 2005/068207 | 7/2005 |
| WO | 2005/108103 | 11/2005 |
| WO | 2006/041401 | 4/2006 |
| WO | 2006/052843 | 5/2006 |
| WO | 2006/061343 | 6/2006 |
| WO | 2006/067073 | 6/2006 |
| WO | 2006/069653 | 7/2006 |
| WO | 2006/129078 | 12/2006 |
| WO | 2006/129086 | 12/2006 |
| WO | 2007/012578 | 2/2007 |
| WO | 2007/031454 | 3/2007 |
| WO | 2007/057367 | 5/2007 |
| WO | 2007/088104 | 8/2007 |
| WO | 2008/055796 | 5/2008 |
| WO | 2010/049281 | 5/2010 |

OTHER PUBLICATIONS

Howbert, et al., "Novel Agents Effective against Solid Tumors: The Diarylsulfonylureas. Synthesis, Activities, and Analysis of Quantitative Structure-Activity Relationships," J. Med. Chem., vol. 33, Issue. 9, pp. 2393-2407, (1990).

Kurzer, F., "Sulfonylureas and Sulfonylthioureas," Chem. Rev., vol. 50, Issue. 1, pp. 1-46, (1952).

Machine translation of JP 09-156228 (no date).

Patent Abstracts of Japan PN 09156228 (no date).

Patent Abstracts of Japan PN 63172689 (no date).

Ulrich, H., "The Chemistry of Sulfonylisocyanates," Chem. Rev., vol. 65, Issue. 365, pp. 369-376, (1965).

PAJ PUB No. 2006/021500.

Knepper, T.P., "Synthetic chelating agents and compounds exhibiting complexing properties in the aquatic environment," Trends in Analytical Chemistry, vol. 22, No. 10, pp. 708-724, (2003)

Ninagawa et al., "Formaldehyde Polymers, $26^{mt;epmubaubxmx}$) : Syntheses and Condensations of Substituted Triphenoxy and Triphenyl Derivatives of 1,3,5-Triazine," Makromol. Chem., vol. 180, pp. 2123-2131, (1979).

"Honey," Wikipedia, http://en.wikipedia.org/wiki/Honey, 16 pgs., (retrieved Sep. 28, 2010).

International Search Report dated May 11, 2006 in International Application No. PCT/EP2005/056763.

Written Opinion of the International Search Authority dated Jun. 26, 2007 in International Application No. PCT/EP2005/056763.

International Preliminary Report on Patentability dated Jun. 26, 2007 in International Application No. PCT/EP2005/056763.

EPO Communication dated Oct. 11, 2013 in EP Patent Application No. EP 2005819361.

Response to EPO Communication filed Apr. 17, 2014 in EP Application No. 2005819361.

(56) References Cited

OTHER PUBLICATIONS

International Search Report dated May 7, 2007 in International Application No. PCT/EP2007/050421.
Written Opinion of the International Search Authority dated Jul. 31, 2008 in International Application No. PCT/EP2007/050421.
International Preliminary Report on Patentability dated Aug. 5, 2008 in International Application No. PCT/EP2007/050421.
EPO Communication dated Sep. 3, 2010 in European Patent Application No. EP 2007712043.
Response to EPO Communication filed Dec. 20, 2010 in European Patent Application No. EP 2007712043.
EPO Communication dated Dec. 1, 2011 in European Patent Application No. EP 2007712043.
Response to EPO Communication filed Jul. 18, 2012 in European Patent Application No. EP 2007712043.
International Search Report dated Feb. 27, 2008 in International Application No. PCT/EP2007/064408.
International Preliminary Report on Patentability dated Jul. 14, 2009 in International Application No. PCT/EP2007/064408.
Written Opinion dated Jul. 9, 2009 in International Application No. PCT/EP2007/064408.
EPO Communication dated Nov. 17, 2009 in EP Patent Application No. 2007858026.
Response to EPO Communication filed Mar. 3, 2010 in EP Patent Application No. 2007858026.
EPO Communication dated Mar. 24, 2010 in EP Patent Application No. 2007858026.
Response to EPO Communication filed Sep. 28, 2010 in EP Patent Application No. 2007858026.
EPO Communication dated Aug. 18, 2011 in EP Patent Application No. 2007858026.
Response to EPO Communication filed Sep. 8, 2011 in EP Patent Application No. 2007858026.
EPO Communication dated Feb. 14, 2012 in EP Patent Application No. 2007858026.
Response to EPO Communication filed Mar. 1, 2012 in EP Patent Application No. 2007858026.
EPO Communication dated Apr. 3, 2012 in EP Patent Application No. 2007858026.
Response to EPO Communication filed May 4, 2012 in EP Patent Application No. 2007858026.
EPO Communication dated Oct. 10, 2013 in EP Patent Application No. 2007858026.
Response to EPO Communication filed Apr. 15, 2014 in EP Patent Application No. 2007858026.
International Search Report dated May 20, 2008 in International Application No. PCT/EP2008/052332.
International Preliminary Report on Patentability dated Sep. 8, 2009 in International Application No. PCT/EP2008/052332.
Written Opinion dated Sep. 8, 2009 in International Application No. PCT/EP2008/052332.
EPO Communication dated Dec. 23, 2009 in EP Application No. 2008717151.
Response to EPO Communication filed Jun. 30, 2010 in EP Application No. 2008717151.
EPO Communication dated Jul. 27, 2010 in EP Application No. 2008717151.
Response to EPO Communication filed Nov. 26, 2010 in EP Application No. 2008717151.
EPO Communication dated Dec. 23, 2010 in EP Application No. 2008717151.
Response to EPO Communication filed Apr. 8, 2011 in EP Application No. 2008717151.
EPO Communication dated May 10, 2011 in EP Application No. 2008717151.
International Search Report dated Aug. 5, 2008 in International Application No. PCT/EP2008/052637.
International Preliminary Report on Patentability dated Sep. 15, 2009 in International Application No. PCT/EP2008/052637.
Written Opinion dated Sep. 15, 2009 in International Application No. PCT/EP2008/052637.
EPO Communication dated Dec. 17, 2009 in EP Application No. 2008717393.
Response to EPO Communication filed Jun. 16, 2010 in EP Application No. 2008717393.
International Search Report dated Oct. 21, 2008 in International Application No. PCT/EP2008/060550.
International Preliminary Report on Patentability dated Feb. 24, 2010 in International Application No. PCT/EP2008/060550.
Written Opinion dated Feb. 22, 2010 in International Application No. PCT/EP2008/060550.
EPO Communication dated Jul. 15, 2010 in EP Application No. 2008787124.
Response to EPO Communication filed Nov. 17, 2010 in EP Application No. 2008787124.
International Search Report dated Feb. 12, 2009 in International Application No. PCT/EP2008/064166.
International Preliminary Report on Patentability dated May 11, 2010 in International Application No. PCT/EP2008/064166.
Written Opinion dated May 7, 2010 in International Application No. PCT/EP2008/064166.
EPO Communication dated Apr. 5, 2013 in EP Application No. 2008848155.
Response to EPO Communication dated May 20, 2014 in EP Application No. 2008848155.
International Search Report dated Dec. 3, 2009 in International Application No. PCT/EP2009/063520.
International Preliminary Report on Patentability dated May 3, 2011 in International Application No. PCT/EP2009/063520.
Written Opinion dated Apr. 27, 2011 in International Application No. PCT/EP2009/063520.
EPO Communication dated Jul. 4, 2011 in European Application No. 09737404.
Response to the EPO Communication filed Jul. 19, 2011 in European Application No. 09737404.
U.S. Appl. No. 11/793,499, Jun. 20, 2007, Preliminary Amendment.
U.S. Appl. No. 11/793,499, May 12, 2011, Office Action.
U.S. Appl. No. 11/793,499, Aug. 8, 2011, Response to Office Action.
U.S. Appl. No. 11/793,499, Sep. 26, 2011, Notice of Allowance.
U.S. Appl. No. 11/978,764, Aug. 9, 2010, Office Action.
U.S. Appl. No. 11/978,764, Nov. 9, 2010, Response to Office Action.
U.S. Appl. No. 11/978,764, Dec. 16, 2010, Office Action.
U.S. Appl. No. 11/978,764, Feb. 1, 2011, Office Action.
U.S. Appl. No. 11/978,764, May 2, 2011, Response to Office Action.
U.S. Appl. No. 11/978,764, May 12, 2011, Office Action.
U.S. Appl. No. 12/087,806, Jul. 15, 2008, Preliminary Amendment.
U.S. Appl. No. 12/087,806, Dec. 8, 2010, Office Action.
U.S. Appl. No. 12/087,806, Apr. 6, 2011, Response to Office Action.
U.S. Appl. No. 12/087,806, Jun. 15, 2011, Notice of Allowance.
U.S. Appl. No. 12/519,423, Jun. 16, 2009, Preliminary Amendment.
U.S. Appl. No. 12/519,423, Jun. 24, 2011, Office Action.
U.S. Appl. No. 12/519,423, Oct. 20, 2011, Response to Office Action.
U.S. Appl. No. 12/519,423, Nov. 21, 2011, Office Action.
U.S. Appl. No. 12/519,423, Dec. 20, 2011, Response to Office Action.
U.S. Appl. No. 12/519,423, Jan. 17, 2012, Notice of Allowance.
U.S. Appl. No. 12/519,423, Apr. 6, 2012, Amendment after Allowance.
U.S. Appl. No. 12/519,423, Apr. 9, 2012, Response to Amendment.
U.S. Appl. No. 12/528,352, Aug. 24, 2009, Preliminary Amendment.
U.S. Appl. No. 12/528,352, Dec. 14, 2011, Office Action.
U.S. Appl. No. 12/529,718, Sep. 3, 2009, Preliminary Amendment.
U.S. Appl. No. 12/529,718, May 10, 2013, Office Action.
U.S. Appl. No. 12/529,718, Aug. 29, 2013, Response to Office Action.
U.S. Appl. No. 12/529,718, Dec. 23, 2013, Office Action.
U.S. Appl. No. 12/529,718, May 23, 2014, Response to Office Action.

(56) References Cited

OTHER PUBLICATIONS

U.S. Appl. No. 12/529,718, Jun. 24, 2014, Notice of Allowance.
U.S. Appl. No. 12/671,547, Feb. 1, 2010, Preliminary Amendment.
U.S. Appl. No. 12/671,547, Aug. 1, 2012, Office Action.
U.S. Appl. No. 12/671,547, Oct. 25, 2012, Response to Office Action.
U.S. Appl. No. 12/671,547, Jan. 31, 2013, Office Action.
U.S. Appl. No. 12/671,547, Jul. 1, 2013, Response to Office Action.
U.S. Appl. No. 12/671,547, Jul. 17, 2013, Office Action.
U.S. Appl. No. 12/671,547, Jul. 30, 2013, Response to Office Action.
U.S. Appl. No. 12/671,547, May 15, 2014, Office Action.
U.S. Appl. No. 12/671,547, Sep. 15, 2014, Response to Office Action.
U.S. Appl. No. 12/671,547, Jan. 30, 2015, Notice of Allowance.
U.S. Appl. No. 12/682,792, Apr. 13, 2010, Preliminary Amendment.
U.S. Appl. No. 12/682,792, Aug. 10, 2012, Office Action.
U.S. Appl. No. 12/682,792, Dec. 12, 2012, Response to Office Action.
U.S. Appl. No. 12/682,792, Feb. 6, 2013, Office Action.
U.S. Appl. No. 12/682,792, Jul. 8, 2013, Response to Office Action.
U.S. Appl. No. 12/682,792, Jul. 29, 2013, Office Action.
U.S. Appl. No. 12/682,792, Oct. 29, 2013, Response to Office Action.
U.S. Appl. No. 12/682,792, Dec. 18, 2013, Office Action.
U.S. Appl. No. 12/682,792, Jul. 18, 2014, Response to Office Action.
U.S. Appl. No. 12/682,792, Sep. 5, 2014, Notice of Allowance.
U.S. Appl. No. 13/123,607, Apr. 11, 2011, Preliminary Amendment.
U.S. Appl. No. 13/123,607, Jun. 17, 2013, Office Action.
U.S. Appl. No. 13/123,607, Sep. 17, 2013, Response to Office Action.
U.S. Appl. No. 13/123,607, Oct. 1, 2013, Office Action.
U.S. Appl. No. 13/123,607, Mar. 31, 2014, Response to Office Action.
U.S. Appl. No. 13/123,607, Apr. 9, 2014, Notice of Allowance.
U.S. Appl. No. 13/123,607, Jul. 7, 2014, Notice of Allowance.
U.S. Appl. No. 13/123,607, Oct. 9, 2014, Office Action.
U.S. Appl. No. 13/123,607, Jan. 30, 2015, Response to Office Action.
U.S. Appl. No. 13/123,607, Mar. 5, 2015, Office Action.

AQUEOUS LASER-SENSITIVE COMPOSITION FOR MARKING SUBSTRATES

RELATED APPLICATION DATA

This application is a continuation of U.S. patent application Ser. No. 13/123,607, filed Nov. 10, 2011, which is a U.S. National Stage Application of International Application No. PCT/EP2009/063520, filed Oct. 16, 2009, which claims the benefit of European Application No. EP08167676.9, filed Oct. 27, 2008, all of which are incorporated herein by reference.

The present invention relates to a an aqueous laser-sensitive composition for marking substrates, to a process for the preparation of this composition, to a substrate coated with this composition and to a process for its preparation, to a process for preparing marked substrates using this composition, and to a marked substrate which is obtainable by the latter process.

Substrates produced on production lines, for example paper, paperboard or plastics, are usually marked with information such as logos, bar codes, expiry dates or batch numbers. Traditionally, the marking of these substrates has been achieved by various printing techniques for example ink-jet or thermal transfer printing. However, these printing techniques are more and more replaced by laser marking as laser marking is cheaper in terms of overall economics and shows performance benefits such as high speed and contact free marking, marking of substrates with uneven surfaces and creation of marks that are so small that they are invisible or nearly invisible to the human eye. Also consumable substrates such as tablets or pills have recently been marked using laser irradiation.

In order to be laser-markable, substrates can be coated with a laser-sensitive composition. A possible laser-sensitive composition, for example, comprises a colour forming compound and a colour developer, which upon laser treatment react to form a coloured image.

WO 2006/052843 discloses media providing non-contacting formation of high contrast marks and methods of use. The media comprises a mark formation layer comprising at least one electron donor dye precursor and at least one electron acceptor compound which react with said electron donor dye precursor upon contact at an elevated temperature to form a colored dye. The electron donor dye precursor is separated from said electron acceptor compound in the mark formation layer by either encapsulating the dye precursor within a polymer having a glass transition temperature of from about 120-190° C., or by dispersing the electron donor dye precursor and the electron acceptor compound into two distinct sub-layers isolated by a third polymer spacing sub-layer.

US2007/0098900 A1 discloses compositions for forming a laser-markable coating, for example a coating composition comprising electron donor dye precursor particles encapsulated with a polymer having a glass transition temperature of from about 150° C. to about 190° C., wherein at least About 90% of the total volume of the dye precursor particles have a diameter from about 0.2 µm to about 5 µm.

US 2007/0087292 A1 discloses color forming compositions, comprising a polymer matrix; an activator comprising aromatic sulfonylurea; a radiation antenna; and an isobenzofuranone color former; wherein the antenna renders the color forming composition reactive to form colors when exposed to radiation of a specific wavelength.

U.S. Pat. No. 5,888,283 discloses a direct thermal ink composition comprising an aqueous dispersion of an initially colorless color former and an initially colorless color developer which combine to form color upon the application of heat, and a sensitizer for the color former and color developer which has been ground together with said color developer, said thermal ink having a solids content of at least 40% by weight and being substantially free of pigments and fillers. In a preferred form, the ink includes a sensitizer in particulate form, which sensitizer particles surround the color developer particles and help provide a barrier between the color developer and/or color former in the composition, preventing premature color development and improving shelf life.

EP 0 637 514 A1 relates to a laser marking method, a laser marking composition and articles having a color development layer made of this composition. The coating solutions contain an inorganic compound having the absorption peak on the infrared absorption spectrum in the region of 900-1000 cm$^{-1}$. In the Examples, coating solutions are disclosed that contain a sulfonyl urea developer, a fluoran colour former and a styrene-acrylic ester-acrylic acid polymer or an ethylene-acrylic ester-acrylic acid copolymer. EP 0659 583 A1 and EP 0 792 756 A2 disclose similar coating solutions.

US 2005-0148467 A1 discloses a heat-sensitive recording material containing a base material, at least one coating layer, in which layer the chemicals of at least two color forming systems are located. At least one of the color forming systems used is a chelate-type color forming system and the other one at least one leuco dye with at least one urea-based developer.

WO 2005/012442 describes coating compositions comprising a pigment, water or an organic solvent, a conductive polymer and optionally a binder. The pigment can be an oxyanion of molybdate or tungstate.

WO 07/088104 discloses a composition comprising a latent activator and a colour former. The composition may contain a sugar alcohol as char forming compound. The most preferred char forming compound is saccharose (sucrose).

U.S. Pat. No. 5,380,694 discloses a thermosensitive recording element comprising in order: (a) a support; (b) at least one thermal layer comprising an organic polymeric binder, a substantially colorless electron donating dye precursor and an electron accepting compound capable of forming color by reacting with said dye precursor; and (c) a layer coated from a non-binder containing solution of a crosslinking agent wherein said agent forms a diol or ether bond with the binder in the underlying thermal layer. The electron accepting compound is particularly preferred a phenol derivative. The dye precursor is for example a 3-diethylamino-7-dibenzylaminofluoran. The binder can be inter alia a polyvinyl alcohol.

EP 1 208 995 A2 discloses a light-permeable thermosensitive recording material having a light permeable support and a thermosensitive recording layer formed thereon and including a leuco dye, a specific color developer for the leuco dye, and a binder resin. Numerous examples for binders are mentioned incl. polyvinyl alcohol, polymethacrylate, polyacrylate, and styrene copolymers.

EP 1 645 430 A1 relates to a method for producing material containing sensitizer dispersed therein for thermal recording articles and a thermal recording article. As a dye to be used to produce a heat-sensitive recording material, numerous fluoran compounds are disclosed. Furthermore, numerous adhesives to be used if necessary in the sensitizer composition in order to produce a heat-sensitive recording material, including sytene/acrylic acid copolymer salts and polyvinyl alcohols are mentioned.

EP 1 295 730 A1 discloses a specific thermosensitive recording material comprising a thermosensitive layer provided on a substrate, the thermosensitive layer comprising a leuco dye and a specific color developer. A binder might be incorporated into the thermosensitive material. Numerous materials including polyvinyl alcohol, acrylamide-acrylate-methacrylate acid ternary polymers etc. are mentioned.

US 2004/0242414 A1 discloses a thermosensitive recording material comprising a specific developer which is an oligomer composition obtained from the reaction of a specific polyvalent isocyanate compound with a specific aromatic amine, and may contain a binder which can be selected from a multitude of materials, for example water-soluble polymer materials such as polyvinyl alcohol.

EP 0 754 564 A2 discloses a heat sensitive recording material and a recording method using the same. A heat sensitive recording material comprising a support, and provided thereon, one or a plurality of heat sensitive recording layers which contains at least one water-insoluble resin selected from the group consisting of an aromatic resin, a resin having a low or no acid value and a resin having a carbonyl group and an alicyclic unit is provided. The aromatic resin might be for example a methyl-methacrylate-styrene copolymer.

U.S. Pat. No. 5,721,190 A discloses a thermosensitive recording medium comprising a support, and a thermosensitive layer containing a specific zinc dithiocarbamate provided on said support and capable of forming a color image when heating imagewise. The thermosensitive layer may contain a binder to firmly bond the layer to the support. Any binder conventionally used in the field of the thermosensitive recording medium may be employed.

U.S. Pat. No. 4,623,557 discloses a process for producing a heat-sensitive recording material comprising the steps of applying to a support a coating composition comprising a color former, a color developer, at least one of a water-soluble binder and a water dispersible binder, and specific monomers or prepolymers to form a layer. Numerous binders are mentioned.

US 2006/0094599 A1 discloses a reversible thermosensitive recording medium, comprising a substrate; and a thermosensitive layer, comprising: an electron donating coloring compound; an electron accepting compound; and a phenol anti-oxidation agent comprising one or more sulfur atoms comprising an alkyl group on one side, wherein the thermosensitive layer reversibly changes its color tone depending on temperature to reversibly record and erase an image thereon.

Research disclosure IPCOM000166609D discloses in its Example 3 an ink and a board obtained by gravure printing. The ink is obtained by combining two dispersions. One of them is obtained by dispersing 30 g of 3-(dibutylamino)-6-methyl-7-anilinofluoran in a mixture of 60 g of an acrylic copolymer emulsion sold under the tradename Carboset® GA-2236 by Lubrizol Advanced Material Inc. and 10 g distilled water using a wet milling process. Separately, 60 g of N-(p-toluenesulfonyl)-N'-(3-p-toluenesulfonyloxy)phenyl) urea is dispersed in a mixture of 120 g Carboset® GA-2236 and 20 g water using a similar wet milling process.

The known systems based on a char forming compound have the disadvantage that their laser-sensitivity is relatively low.

On the other hand, it is difficult to achieve good image stability and low background discoloration properties of the coated substrate with color former based substrates while maintaining high laser sensitivity and high marking quality. Other problems are the emission of undesired chemical vapour (smoke) upon irradiation, a lack of transparency and possible toxicity of the compounds used.

It is an object of the present invention to provide an aqueous composition which produces a color change under the influence of radiation energy which is of higher sensitivity compared to known char forming color change systems.

These objects are solved according to the present invention by an aqueous coating composition comprising a colour former, a developer, and a binder, wherein
(a) the weight ratio between the developer and the colour former is in the range of from 1 to 5; preferably in the range of from 1.5 to 3;
(b) the binder comprises an acrylate binder, comprising acrylic acid and styrene, and at least one additional monomer selected from the group consisting of α-methyl styrene, ethyl acrylate and 2-ethylhexyl acrylate; and
(c) the colour former and/or the developer are present in an un-encapsulated form.

The invention moreover provides a process for preparing the composition of the invention, which comprises the step of mixing a colour former and a developer in a weight ratio in the range of from 1 to 5; a binder comprising an acrylate binder, comprising acrylic acid and styrene, and at least one additional monomer selected from the group consisting of α-methyl styrene, ethyl acrylate and 2-ethylhexyl acrylate; and wherein the colour former and/or the developer are present in an un-encapsulated form.

The colour former generally comprises an electron donating leuco dye and an electron accepting developer.

The colour former used in the composition of the present invention is preferably selected from the group consisting of fluorans, phthalides, triarylmethanes, benzoxazines, quinazolines, spiropyrans, quinones, and leucozines such as a thiazine respectively an oxazine or mixtures thereof. Preferably, the colour former is a fluoran.

Examples of fluorans are 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethylamino-6-methyl-7-(dibenzylamino) fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-carboxyethylfluoran, 3-diethylamino-7-methylfluoran, 3-diethylamino-6,8-dimethylfluoran, 3-diethylamino-7-chlorofluoran, 3-dibutylamino-6-methylfluoran, 3-cyclohexylamino-6-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)-fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino)fluoran, 3-diethylamino-6-methyl-7-(p-methylanilino)fluoran, 3-diethylamino-6-ethoxyethyl-7-anilinofluoran, 3-diethylamino-6-methyl-7-(3-methylanilino)fluoran, 3-diethylamino-7-(3-trifluoromethylanilino)fluoran, 3-diethylamino-7-(2-chloroanilino)fluoran, 3-diethylamino-7-(2-fluoroanilino) fluoran, 3-diethylamino-6-chloro-7-anilinofluoran, 3-dibutylamino-6-methyl-7-anilinofluoran, 3-dibutylamino-6-methyl-7-(2,4-dimethylanilino)fluoran, 3-dibutylamino-6- methyl-7-(2-chloroanilino)fluoran, 3-dibutylamino-6-methyl-7-(4-chloroanilino)-fluoran, 3-dibutylamino-6-methyl-7-(2-fluoroanilino)fluoran, 3-dibutylamino-6-methyl-7-(3-tri-fluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino)fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-N-p-tolylamino)-6-methyl-7-anilinofluoran, 3-(N-ethyl-N-p-tolylamino)-6-methyl-7-methylfluoran, 3-(N-ethyl-N-isoamylamino)-6-methyl-7-anilinofluoran, 3-(N-ethyl-N-isoamylamino)-7-(2-chloroanilino)fluoran, 3-(N-ethyl-N-isoamylamino)-6-chloro-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-p-(p-dimethylaminophenyl)aminoanilinofluoran, 2-methoxy-6-p-(p-dimethylaminophenyl)aminoanilinofluoran, 2-chloro-3-methyl-6-p-(p-phenylaminophenyl)-aminoanilinofluoran, 2-diethylamino-6-p-(p-dimethylaminophenyl)aminoanilinofluoran, 2-phenyl-6-methyl-6-p-(p-phenylaminophenyl)aminoanilinofluoran, 2-benzyl-6-p-(p-phenylaminophenyl)aminoanilinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutylaminophenyl)aminoanilinofluoran and 2,4-dimethyl-6-[(4-di-methylamino)anilino]fluoran.

The fluorans can be prepared by methods known in the art, for example 3-diethylamino-7-dibenzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1,3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2 154 597 A.

Preferably, the colour former comprises a fluoran or a mixture of fluorans selected from the group consisting of 3-diethylamino-7-(ethoxycarbonyl)-fluoran (as sold for example under the tradename Ciba® Pergascript® Orange I-G), 3-dibutylamino-6-methyl-7-anilinofluoran (as sold for example under the tradename Ciba® Pergascript® Black 2C), 3-diethylamino-6-methyl-7-anilinofluoran (as sold for example under the tradename Ciba® Pergascript® Black 1C), 3-(N-ethyl-N-isoamylamino)-6-methyl-7-anilinofluoran (as sold for example under the tradename S205 by Yamada Chemical Company), 3-dipentylamino-6-methyl-7-anilinofluoran (as sold for example under the tradename Black 305 by Yamada Chemical Company), and 3-(N-ethyl-N-p-tolylamino)-6-methyl-7-anilinofluoran (as sold for example under the tradename ETAC by Yamada Chemical Company).

More preferred colour formers are 3-dibutylamino-6-methyl-7-anilinofluoran and 3-diethylamino-6-methyl-7-anilinofluoran, 3-(N-ethyl-N-isoamylamino)-6-methyl-7-anilinofluoran and 3-(N-ethyl-N-p-tolylamino)-6-methyl-7-anilinofluoran. The most preferred colour former is 3-dibutylamino-6-methyl-7-anilinofluoran.

Examples of phthalides are crystal violet lactone (3,3-bis (p-dimethylaminophenyl)-6-dimethyl-aminophtalide), 3,3-bis(p-dimethylaminophenyl)phthalide, 3,3-bis(1-ethyl-2-methylindol-3-yl)phthalide, 3,3-bis(1-octyl-2-methylindol-3-yl)phthalide, 3-(4-diethylaminophenyl)-3-(1-ethyl-2-methylindol-3-yl)-phthalide, 7-(N-ethyl-N-isopentylamino)-3-methyl-1-phenyl-spiro[4H-chromeno[2,3-c]pyrazole-4(1H)-3'phthalide, 3,6,6'-tris(dimethylamino) spiro-[fluorene-9,3'-phthalide], 3,6,6'-tris(diethylamino) spiro[fluorene-9,3'-phthalide], 3,3-bis-[2-(p-dimethylaminophenyl)-2-(p-methoxyphenyl)ethenyl-4,5,6,7-tetrabromophthalide, 3,3-bis-[2-(p-dimethylaminophenyl)-2-(p-methoxyphenyl)ethenyl-4,5,6,7-tetrachlorophthalide, 3,3-bis[1,1-bis(4-pyrrolidinophenyl) ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclo-hexylethylamino-2-methoxyphenyl)-3-(1-ethyl-2-methylindol-3-yl)-4-azaphthalide.

The following phthalides are preferred:
Crystal violet lactone or 3,3-bis(p-dimethylaminophenyl)-6-dimethylaminophthalide (as sold for example under the tradename Ciba® Pergascript® Blue I-2RC), 3-(4-diethylamino-2-ethoxyphenyl)-3-(1-octyl-2-methylindol-3-yl)-4-azaphthalide (as sold for example under the tradename Ciba® Pergascript® Blue I-2G), 3,3-bis(1-octyl-2-methylindol-3-yl)phthalide (as sold for example under the tradename Ciba® Pergascript® Red I-6B).

The phthalides can be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Examples of benzoxazines are 2-phenyl-4-(4-diethylaminophenyl)-4-(4-methoxyphenyl)-6-methyl-7-dimethyl-amino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine.

An example of a quinazoline is 4,4'-[1-methylethylidene) bis(4,1-phenyleneoxy-4,2-quina-zolinediyl)]bis[N,N-diethylbenzeneamine]. An example of a triarylmethane is bis(N-methyldi-phenylamine)-4-yl-(N-butylcarbazole)-3-yl-methane, which can be prepared as described in GB 1,548,059.

Examples of spiropyrans are 1',3',3'-trimethylspiro[2H-1-benzopyran-2,2'-indoline], 1,3,3-trimethylspiro[indoline-2,3'-[3H]naphth[2,1-b][1,4]oxazine] and 1',3',3'-trimethyl-spiro-[2H-1-benzothiopyran-2,2'-indoline].

An example of a quinone colour forming compound is hematoxyline. An example of an oxazine is 3,7-bis(dimethylamino)-10-benzoylphenoxazine. An example of a thiazine is 3,7-bis(dimethylamino)-10-benzoylphenothiazine.

The aqueous composition of the present invention comprises a developer for the colour forming compound.

The developer may be a sulfonylurea derivative of the formula

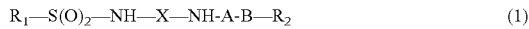

$$R_1-S(O)_2-NH-X-NH-A-B-R_2 \quad (1)$$

wherein $R_1$ is unsubstituted or substituted phenyl, naphthyl or $C_{1-20}$-alkyl, X is a group of the formula —C(NH)—, —C(O)— or —C(S)—, A is unsubstituted or substituted phenylene, naphthylene or $C_{1-12}$-alkylene, or is an unsubstituted or substituted heterocyclic group, B is a linking group of formula —O—$SO_2$—, —$SO_2$—O—, —NH—$SO_2$—, —$SO_2$—NH—, —S—$SO_2$—, —O—CO—, —O—CO—NH—, —NH—CO—, —NH—CO—O—, —S—CO—NH—, —S—CS—NH—, —CO—NH—$SO_2$—, —O—CO—NH—$SO_2$—, —NH=CH—, —CO—NH—CO—, —S—, —CO—, —O—, —$SO_2$—NH—CO—, —O—CO—O— and —O—PO—$(OR_2)_2$, and $R_2$ is unsubstituted or substituted aryl or benzyl or $C_{1-20}$-alkyl, with the proviso, that, if B is not a linking group of formula —O—$SO_2$—, $R_2$ is unsubstituted or substituted phenyl, naphthyl or $C_{1-8}$-alkyl and that, if B is —O—, $R_2$ is not alkyl.

$R_1$ as phenyl or naphthyl can be unsubstituted or substituted by, for example, $C_{1-8}$-alkyl, $C_{1-8}$-alkoxy or halogen. Preferred substituents are $C_{1-4}$-alkyl, especially methyl or ethyl, $C_{1-4}$-alkoxy, especially methoxy or ethoxy, or halogen, especially chlorine. $R_1$ as naphthyl is preferably unsubstituted. $R_1$ as phenyl is preferably substituted, especially by one of the above alkyl substituents.

$R_1$ as $C_{1-20}$-alkyl can be unsubstituted or substituted by, for example $C_{1-8}$-alkoxy or halogen. Preferred substituents are $C_{1-4}$-alkoxy, especially methoxy or ethoxy, or halogen, especially chlorine. $R_1$ as $C_{1-20}$-alkyl is preferably unsubstituted.

Preferably, $R_1$ is phenyl which is unsubstituted or substituted by $C_{1-8}$-alkyl, $C_{1-8}$-alkoxy or halogen. Of most importance are the substituted phenyl groups. Highly preferred are phenyl groups which are substituted by $C_{1-4}$-alkyl, preferably by methyl.

X is preferably a group of the formula —C(S)— or —C(O)—, especially a group of the formula —C(O)—, A as a phenylene or naphthylene group can be unsubstituted or substituted by, for example, $C_{1-8}$-alkyl, halogen-substituted $C_{1-8}$-alkyl, $C_{1-8}$-alkoxy-substituted $C_{1-8}$-alkoxy, halogen-substituted $C_{1-8}$-alkoxy, $C_{1-8}$-alkylsulphonyl, halogen, phenyl, phenoxy or phenoxycarbonyl. Preferred alkyl and alkoxy substituents are those containing 1 to 4 carbon atoms. Preferred substituents are $C_{1-8}$-alkyl, halogen-substituted $C_{1-8}$-alkyl, $C_{1-8}$-alkylsulphonyl or halogen. A as a naphthylene group is preferably unsubstituted.

A as a heterocyclic group is preferably pyrimidylene which is unsubstituted or substituted by $C_{1-8}$-alkyl, especially by $C_{1-4}$-alkyl.

A as a $C_{1-12}$-alkylene group is preferably $C_{1-8}$-alkylene, especially $C_{1-4}$-alkylene.

Preferred groups A are phenylene groups which are unsubstituted or substituted by $C_{1-8}$-alkyl, halogen-substituted $C_{1-8}$-alkyl, $C_{1-8}$-alkoxy-substituted $C_{1-8}$-alkyl, $C_{1-8}$-alkoxy, halogen-substituted $C_{1-8}$-alkoxy, $C_{1-8}$-alkylsulphonyl, halogen, phenyl, phenoxy or phenoxycarbonyl, especially $C_{1-8}$-alkyl, halogen-substituted $C_{1-8}$-alkyl, $C_{1-8}$-alkylsulphonyl or halogen.

Highly preferred groups A are phenylene groups which are unsubstituted or substituted by $C_{1-4}$-alkyl or halogen, especially unsubstituted phenylene groups.

Preferred linking groups B are those of formulae —O—$SO_2$—, —$SO_2$—O—, —$SO_2$—NH—, —S—$SO_2$—, —O—, —O—CO— and —O—CO—NH—, especially linking groups of formulae —O—$SO_2$—, —$SO_2$—O— and —$SO_2$—NH—. Highly preferred are the linking groups B of formula —O—$SO_2$— and —O—.

$R_2$ as aryl is preferably phenyl or naphthyl which can be unsubstituted or substituted by, for example, $C_{1-8}$-alkyl, halogen-substituted $C_{1-8}$-alkyl, $C_{1-8}$-alkoxy-substituted $C_{1-8}$-alkyl, $C_{1-8}$-alkoxy, halogen-substituted $C_{1-8}$-alkoxy or halogen. Preferred alkyl and alkoxy substituents are those containing 1 to 4 carbon atoms. Preferred substituents are $C_{1-4}$-alkyl and halogen. $R_2$ as naphthyl is preferably unsubstituted.

$R_2$ as benzyl can be substituted by the substituents given for $R_2$ as phenyl or naphthyl. Unsubstituted benzyl is preferred.

$R_2$ as $C_{1-20}$-alkyl is preferably $C_{1-8}$-alkyl, especially $C_{1-6}$-alkyl, and can be unsubstituted or substituted by, for example, $C_{1-8}$-alkoxy, halogen, phenyl or naphthyl. Preferred are the unsubstituted alkyl groups, especially $C_{1-4}$-alkyl.

Preferred groups $R_2$ are $C_{1-6}$-alkyl; halogen-substituted $C_{1-6}$-alkyl; phenyl-substituted $C_{1-6}$-alkyl; naphthyl-substituted $C_{1-6}$-alkyl; phenyl which is unsubstituted or substituted by $C_{1-8}$-alkyl, halogen-substituted $C_{1-8}$-alkyl, $C_{1-8}$-alkoxy-substituted $C_{1-8}$-alkyl, $C_{1-8}$-alkoxy, halogen-substituted $C_{1-8}$-alkoxy or halogen; naphthyl and benzyl which is substituted by $C_{1-4}$-alkyl or halogen.

Highly preferred groups $R_2$ are $C_{1-4}$-alkyl; halogen-substituted $C_{1-4}$-alkyl; phenyl which is unsubstituted or substituted by $C_{1-4}$-alkyl or halogen; naphthyl and benzyl which is unsubstituted or substituted by $C_{1-4}$-alkyl or halogen, especially phenyl which is unsubstituted or substituted by $C_{1-4}$-alkyl.

Preferred are developers of formula (1), wherein
$R_1$ is phenyl which is substituted by $C_{1-4}$-alkyl, preferably by methyl,
X is a group of the formula —C(O)—,
A is phenylene which is unsubstituted or substituted by $C_{1-4}$-alkyl or halogen, preferably unsubstituted phenylene, like 1,3-phenylene,
B is a linking group of formula —O—$SO_2$— or —O— and
$R_2$ is phenyl, naphthyl or benzyl which is unsubstituted or substituted by $C_{1-4}$-alkyl or halogen, especially phenyl which is substituted by $C_{1-4}$-alkyl.

Many syntheses are known for sulphonyl ureas and are incorporated herein by reference (J. Med. Chem., 1990, (33), 9, 2393; Chem. Rev., 1952, (50), 1; Chem. Rev., 1965, (65), 365). In particular, N-(p-toluenesulfonyl)-N'-3-(p-toluenesulfonyloxy)phenyl) urea can be prepared as described in example 4 of WO 00/35679.

Suitable colour developers for use with the above colour formers include in particular 2,2-bis(4-hydroxyphenyl)propane (bis phenol A), 2,2-bis(4'-hydroxyphenyl)-4-methylpentane, benzyl-4-hydroxybenzoate, 4,4'-dihydroxydiphenylsulfone, 2,4'-dihydroxydiphenylsulfone, 4-hydroxy-4'-isopropoxydiphenylsulfone (as sold for example under the tradename D8 by Nippon Soda), 2,2'-diallyl-4,4'-sulfonyldiphenol (as sold for example under the tradename TG-SA by Nippon Kayaku), phenol, 4,4'-sulfonylbis-polymer with 1,1'-oxobis(2-chloroethane) (as sold for example under the tradename D90 by Nippon Soda), N-(p-toluenesulfonyl)-N'-3-(p-toluenesulfonyloxyphenyl)urea (as sold for example under the tradename Ciba® Pergafast® 201), 4-[(4-(1-methylethoxy)phenyl)sulfonyl]-phenol and carbamic acid, N,N'-[sulfonylbis[4,1-phenyleneiminocarbonylimino(methylphenylene)]]bis-,C,C'-diphenyl ester (as sold by Asahi Denka Kogyo under the tradename UU), 4,4'-bis(p-toluenesulphonylaminocarbonylamino)diphenylmethane) (as sold for example under the tradename B-TUM), zinc bis[(4-n-octyloxycarbonylamino)salicylate]dihydrate (as sold for example under the tradename SZ-110 by Mitsui Chemicals), 4-hydroxybenzoate derivative of a polypentaerythritol compound with CAS number 378244-93-0 as sold for example by Asahi Denka Kogyo under the tradename K5, and mixtures thereof.

The aqueous laser sensitive composition of the present invention can contain other known colour developers. Examples of such colour developers are 4,4'-sec-butylidene bisphenol, 4,4'-cyclohexylidene bisphenol, 2,2-dimethyl-3,3-di(4-hydroxyphenyl)butane, 2,2'-dihydroxydiphenyl, 1-phenyl-1,1-bis(4-hydroxyphenyl)butane, 4-phenyl-2,2-bis(4-hydroxyphenyl)butane, 1-phenyl-2,2-bis(4-hydroxyphenyl)butane, 2,2-bis(4'-hydroxy-3'-methylphenyl)-4-methylpentane, 2,2-bis(4'-hydroxy-3'-tert-butyllphenyl)-4-methylpentane, 4,4'-sec-butylidene-bis(2-methylphenol), 4,4'-isopropylidene-bis(2-tert-butylphenol), 2,2-bis(4'-hydroxy-3'-isopropylphenyl)-4-methylpentane, allyl-4,4-bis(4'-hydroxyphenyl)pentanoate, propargyl-4,4-bis(4'-hydroxyphenyl)pentanoate, n-propyl-4,4-bis(4'-hydroxyphenyl)pentanoate, 2,4-bis(phenylsulfonyl) phenol, 2-(4-methylsulfonyl)-4-(phenylsulfonyl) phenol, 2-(phenylsulfonyl)-4-(4-methylsulfonyl) phenol, 2,4-bis(4-methylphenylsulfonyl) phenol, pentamethylene-bis(4-hydroxybenzoate), 2,2-dimethyl-3,3-di(4-hydroxyphenyl)pentane, 2,2-di(4-hydroxyphenyl)hexane, 4,4'-dihydroxydiphenyl thioether, 1,7-di(4-hydroxyphenylthio)-3,5-dioxaheptane, 2,2'-bis(4-hydroxyphenylthio)diethylether, 4,4'-dihydroxy-3,3'-dimethylphenyl thioether; benzyl-4-hydroxybenzoate, ethyl-4-hydroxybenzoate, propyl-4-hydroxybenzoate, isopropyl-4-hydroxybenzoate, butyl-4-hydroxybenzoate, isobutyl-4-hydroxybenzoate, 4-hydroxy-4'-methyldiphenyl sulfone, 4-hydroxy-4'-butoxydiphenyl sulfone, 3,4-dihydroxy-4'-methyldiphenyl sulfone, 4,4'-dihydroxy-3,3',5,5'-tetrabromodiphenyl sulfone, N-p-toluenesulphonyl-N'-phenyl urea, dimethyl 4-hydroxyphthalate, dicyclohexyl 4-hydroxyphthalate, diphenyl 4-hydroxyphthalate, 4-[2-(4-methoxyphenyloxy)ethyloxy]salicylate, 3,5-di-tert-butylsalicylic acid, 3-benzyl salicylic acid, 3-(α-methylbenzyl) salicylic acid, 3-phenyl-5-(α,α-dimethylbenzyl) salicylic acid, 3,5-di-α-methylbenzyl salicylic acid; metal salts of salicylic acid, 2-benzylsulfonylbenzoic acid, 3-cyclohexyl-4-hydroxybenzoic acid, zinc benzoate, zinc 4-nitrobenzoate, 4-(4'-phenoxybutoxy)phthalic acid, 4-(2'-phenoxyethoxy) phthalic acid, 4-(3'-phenylpropyloxy)phthalic acid, mono(2-hydroxyethyl)-5-nitro-isophthalic acid, 5-benzyloxycarbonyl isophthalic acid, 5-(1'-phenylethanesulfonyl) isophthalic acid and bis(1,2-dihydro-1,5-dimethyl-2-phenyl-3H-pyrazol-3-one-O)bis(thiocyanato-N)zinc, $ZnCl_2$ and ammonium stearate.

Preferred developers are selected from among sulfonylurea derivatives (for example N-(p-toluenesulfonyl)-N'-3-(p-toluenesulfonyloxyphenyl)urea; 4,4'-bis(p-toluenesulphonylaminocarbonylamino)diphenylmethane), 4,4'-Bisphenol sulfone, 2,4'-dihydroxydiphenylsulfone, 4-hydroxy-4'-isopropoxydiphenylsulfone, 4-hydroxybenzoate derivative of a polypentaerythritol compound with CAS number 378244-93-0; phenol, 4,4'-sulfonylbis-polymer with 1,1'-oxobis(2-chloroethane); N,N'-[sulfonylbis[4,1-phenylene-iminocarbonylimino(methylphenylene)]]bis-,C,C'-diphenyl ester; $ZnCl_2$, octylammonium stearate and ammonium stearate.

In a preferred embodiment of the present coating composition, the coating composition may contain in addition to a colour former and possibly a developer also a sensitiser.

Suitable sensitisers include stearamide, amide waxes, 1,2-diphenoxyethane, 1,2-bis(3-methylphenoxy)ethane, benzyl-2-naphthyl ether, dibenzyl oxalate and di-(4-methylbenzyl) oxalate.

The composition of the present invention may comprise a latent activator which can be either an acid derivative or a salt of an acid and an amine.

The acid derivative can be any derivative of an acid having a pKa in water at 25° C. of below 10.0. Preferably, it is a derivative of an acid having a pKa of below 5.0, more preferably of below 3.0.

Preferred acid derivatives are derivatives of sulfuric acids, phosphoric acids or carboxylic acids.

Examples of sulfuric acids are sulfuric acid, fluorosulfuric acid, chiorosulfuric acid, nitrosylsulfuric acid, 4-styrene sulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrenesulfonic acid-co-maleic acid). Examples of phosphoric acids are phosphoric acid, fluorophosphoric acid and hexafluorophosphoric acid. Examples of carboxylic acids are dichloroacetic acid, trichloroacetic acid, oxalic acid and maleic acid. More preferred acid derivatives are ester, amide and thioester derivatives of sulfuric acids, phosphoric acids or carboxylic acids.

Ester, amide and thioester derivatives of sulfuric acids, phosphoric acids or carboxylic acids can be sulfuric acids, phosphoric acids or carboxylic acids having at least one OH-group substituted with $OR^1$, $NR^2R^3$ or $SR^4$, wherein $R^1$, $R^2$, $R^3$ and $R^4$ can be $C_{1-30}$-alkyl, $C_{2-30}$-alkenyl, $C_{4-8}$-cycloalkyl, $C_{7-12}$-bicycloalkyl, $C_{5-8}$-cycloalkenyl, aralkyl, aralkenyl or aryl, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Ester, amide and thioester derivatives of sulfuric acids, phosphoric acids or carboxylic acids can also be two acids, selected from the group consisting of sulfuric acids, phosphoric acids and carboxylic acids, being linked by an O-A-O, $NR^5$-E-$R^6$N or S-J-S group, wherein $R^5$ and $R^6$ can be as defined for $R^1$, $R^2$, $R^3$ and $R^4$, and A, E and J can be $C_{2-14}$-alkylene, $C_{2-14}$-alk-enylene, $C_{4-8}$-cycloalkylene, $C_{4-8}$-cycloalkenylene or arylene, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Examples of $C_{1-30}$-alkyl are methyl, ethyl, propyl, isopropyl, butyl, sec-butyl, isobutyl, tert-butyl, pentyl, hexyl, heptyl, octyl, nonyl, decyl, undecyl, dodecyl, myristyl, palmityl, stearyl and arachinyl. Examples of $C_{2-30}$-alkenyl are vinyl, allyl, linolenyl, docosahexaenoyl, eicosapentaenoyl, linoleyl, arachidonyl and oleyl. Examples of $C_{4-8}$-cycloalkyl are cyclopentyl and cyclohexyl. An example of a $C_{7-12}$-bicycloalkyl is 2-norbornyl. An example of $C_{5-8}$-cycloalkenyl is cyclohexenyl. Examples of aralkyl are benzyl and 2-phenylethyl. Examples of aryl are phenyl, 1,3,5-triazinyl or naphthyl. Examples of $C_{1-6}$-alkyl are methyl, ethyl, propyl, isopropyl, butyl, sec-butyl, isobutyl, tert-butyl, pentyl, and hexyl. Examples of $C_{1-6}$-alkoxy are methoxy, ethoxy, propoxy, isopropoxy, butoxy, sec-butoxy, tert-butxy, isobutoxy, pentoxy and hexoxy. Examples of halogens are chlorine and bromine. Examples of $C_{2-14}$-alkylene are ethylene, trimethylene, tetramethylene, ethylethylene, pentamethylene, hexamethylene, heptamethylene and octamethylene. Examples of $C_{4-8}$-cycloalkylene are cyclopentylene and cyclohexylene. Examples of $C_{4-8}$-cycloalkenylene are cyclopentenylene and cyclohexenylene. An example of arylene is phenylene.

Preferred $C_{1-30}$-alkyls are $C_{1-6}$-alkyls and preferred $C_{2-30}$-alkenyls are $C_{2-6}$-alkenyls. Examples of $C_{2-6}$-alkenyls are vinyl and allyl.

Even more preferred acid derivatives are ester, amide and thioester derivatives of sulfuric acids. Especially preferred acid derivatives are ester derivatives of sulfuric acids, in particular of organic sulfuric acids.

Examples of organic sulfuric acids are 4-styrene sulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrenesulfonic acid-co-maleic acid).

Preferred ester derivatives of organic sulfuric acids are organic sulfuric acids having at least one OH-group substituted with $OR^1$, wherein $R^1$ can be $C_{1-6}$-alkyl or $C_{4-8}$-cycloalkyl, which can be unsubstituted or substituted with $C_{1-6}$-alkyl or $C(O)OC_{1-6}$-alkyl. Preferred ester derivatives of organic sulfuric acids are also two sulfuric acids being linked by an O-A-O group, wherein A is $C_{4-8}$-cycloalkylene. A preferred organic sulfonic acid is p-toluenesulfonic acid.

More preferred ester derivatives of organic sulfuric acids are cyclohexyl-p-toluenesulfonate, 2-methylcyclohexyl-p-toluenesulfonate, menthyl-p-toluenesulfonate, 1,4-cyclohexanediol di-p-toluenesulfonate, 4-tosylcyclohexanecarboxylic acid ethyl ester and 2,2-dimethylpropyl-p-toluenesulfonate.

The acid derivatives are either commercially available or can be prepared by known processes, e.g. by the reaction of a suitable alcohol with a suitable sulfonyl chloride in the presence of a catalyst.

The acid can have a pKa in water at 25° C. of below 10.0. Preferably, it has a pKa of below 5.0, more preferably of below 3.0.

Preferred acids are sulfuric acids, phosphoric acids or carboxylic acids. More preferred acids are sulfuric acids. Most preferred acids are organic sulfuric acids.

The amine can be of formula $NR^7R^8R^9$, wherein $R^7$, $R^8$ and $R^9$ can be the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, which can be unsubstituted or substituted with amino and/or hydroxy, or $R^8$ and $R^9$, together with the nitrogen of the amine, form a 5- to 7-membered ring. Examples of amines of formula $NR^7R^8R^9$ are ammonia, methylamine, ethylamine, propylamine, butylamine, diethylamine, ethylene diamine, 1,2-diaminopropane, ethanolamine, cyclohexylamine, aniline, melamine, pyrrole, morpholine, pyrrolidine and piperidine.

Preferably, the amine is of formula $NR^7R^8R^9$, wherein $R^7$ is hydrogen and $R^8$ and $R^9$ can be the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, which can be unsubstituted or substituted with amino and/or hydroxy, or $R^8$ and $R^9$, together with the nitrogen of the amine, form a 5- to 7-membered ring.

More preferably, the amine is of formula $NR^7R^8R^9$, wherein $R^7$ and $R^8$ are hydrogen and $R^9$ can be hydrogen, $C_{1-30}$-alkyl, $C_{2-30}$-alkenyl, $C_{5-8}$-cycloalkenyl, aralkyl, aralkenyl or aryl, which can be unsubstituted or substituted with amino and/or hydroxy.

Preferred latent activators are selected from the group consisting of ammonium phosphate, ammonium polyphosphate (for example EXOLIT® AP 420 from Clariant), ammonium sulfite, ammonium thiosulfate, ammonium sulfamate and ammonium sulfate. Preferably, the latent activator is at least one selected from the group consisting of ammonium phosphate and ammonium sulfate.

The composition of the present invention may contain in addition to one or more colour formers a second type of compounds capable of forming a coloured substance upon exposition to energy, for example an oxygen containing transition metal compound.

The oxygen containing transition metal compound is preferably selected from the group consisting of oxygen containing chromium, molybdenum and tungsten compounds.

Examples of oxygen containing chromium, molybdenum and tungsten compounds are chromium, molybdenum and tungsten oxides, alkali metal, earth alkaline metal, ammonium and mono-, di-, tri- and tetra-$C_{1-8}$-alkylammonium mono-, di- and polychromates, -molbydates and -tungstates, alkali metal, earth alkaline metal, ammonium and mono-, di-, tri- and tetra-$C_{1-8}$-alkylammonium heteropolychromates, -molybdates and -tungstates, alkali metal, earth alkaline metal, ammonium and mono-, di-, tri- and tetra-$C_{1-8}$-alkylammonium peroxo chromates, -molybdates and -tungstates, and hydroxyl containing chromates, molybdates and tungstates.

Examples of $C_{1-8}$-alkyl are methyl, ethyl, propyl, isopropyl, butyl, isobutyl, sec-butyl, tert-butyl, pentyl, hexyl, heptyl, octyl and 2-ethylhexyl.

Examples of chromium, molybdenum and tungsten oxides are chromium(III) oxide, chromium(VI) oxide, molybdenum(IV) oxide, molybdenum(VI) oxide, tungsten (IV) oxide and tungsten(VI) oxide.

Examples of alkali metal, earth alkaline metal, ammonium and mono-, di-, tri- and tetra-$C_{1-8}$-alkylammonium mono-, di- and polychromates, -molybdates and -tungstates are ammonium chromate, potassium chromate, magnesium chromate, ammonium dichromate, sodium dichromate, potassium dichromate, ammonium molybdate, sodium molybdate, potassium molybdate, magnesium molybdate, calcium molybdate, ammonium dimolybdate, ammonium heptamolybdate, ammonium octamolybdate, ammonium decamolybdate, ammonium tungstate, sodium tungstate, potassium tungstate, magnesium tungstate, calcium tungstate, ammonium metatungstate, sodium metatungstate and ammonium paratungstate.

Polychromates, molybdates and tungstates can also be called isopolychromates, -molybdates and -tungstates.

Examples of alkali metal, earth alkaline metal, ammonium and mono-, di-, tri- and tetra-$C_{1-8}$-alkylammonium heteropolychromates, -molybdates and -tungstates are $[Fe^{III}(Mo_6O_{24})]^{9-}$, $[Te^{VI}(Mo_6O_{24})]^{6-}$, $[I^{VII}(Mo_6O_{24})]^{5-}$, $[Cr^{III}(Mo_6O_{24}H_6)]^{3-}$, $[Mn^{IV}(Mo_9O_{32})]^{6-}$, $[Ni^{IV}(Mo_9O_{32})]^{6-}$, $[(P^V(Mo_{12}O_{40})]^{3-}$, $[(Si^{IV}(Mo_{12}O_{40})]^{4-}$, $[(S^{IV}(Mo_{12}O_{40})]^{4-}$, $[(Ce^{IV}(Mo_{12}O_{42})]^{8-}$, $[I(W_6O_{24})]^{5-}$, $[Te(W_6O_{24})]^{6-}$, $[P(W_{12}O_{40})]^{3-}$ and $[Si(W_{12}O_{40})]^{4-}$ having sodium, potassium, magnesium, calcium or ammonium or mixtures thereof as countercation.

Examples of hydroxyl containing chromates, molybdates and tungstates are chromium(III) hydroxide, chromium(II) hydroxide and hexahydroxymolybdate.

Oxygen containing chromium, molybdenum or tungsten compounds are either commercially available or can be prepared by methods known in the art.

More preferably, the oxygen containing transition metal compound is selected from the group consisting of alkali metal, earth alkaline metal, ammonium and mono-, di-, triand tetra-$C_{1-8}$-alkylammonium mono-, di- and polychromates, -molybdates and -tungstates.

Most preferably, the oxygen containing transition metal compound is selected from the group consisting of alkali metal, ammonium and mono-, di-, tri- and tetra-$C_{1-8}$-alkylammonium mono-, di- and polymolybdates and -tungstates. Examples of alkali metal and ammonium mono-, di- and polymolybdates and -tungstates are ammonium molybdate, sodium molybdate, potassium molybdate, ammonium dimolybdate, ammonium heptamolybdate, ammonium octamolybdate, ammonium decamolybdate, ammonium tungstate, sodium tungstate, potassium tungstate, ammonium metatungstate, sodium metatungstate and ammonium paratungstate.

The use of ammonium octamolybdate (AOM) is particularly preferred. AOM can be seen as a catalyst for the color change reaction of char forming compounds. Moreover, it can be a catalyst to trigger color former systems and it is an IR absorber for the $CO_2$ laser.

The oxygen containing transition metal compound may also be a mixture of a number of different transition metals and their oxygen containing oxides and/or salts as described in WO 2005/068207. For instance, copper and molybdenum or copper and tungsten oxide binary metal salts may be used.

As a second type of compound, capable of forming a coloured substance upon exposition to energy, a metal-chelate-type colour forming system may be used.

Metal-chelate-type colour forming systems may comprise double salts of higher fatty acids as one of the components of the system. Examples are iron-zinc double salt of stearic acid, iron-zinc double salt of montanic acid, iron-zinc double salt of acid wax, iron-zinc double salt of behenic acid, iron-calcium double salt of behenic acid, iron-aluminum double salt of behenic acid, iron-magnesium double salt of behenic acid, silver-calcium double salt of behenic acid, silver-magnesium double salt of behenic acid, calcium-aluminium double salt of behenic acid, which are used either alone or with other double salts.

With these double salts, polyvalent hydroxyaromatic compounds, diphenylkarbazide, di phenylkarbazone, hexa methylenetetramine, spirobenzopyran, 1-formyl-4-phenylsemicarbazide, etc. are used for color formation.

Furthermore, the composition of the present invention may comprise at least one char forming compound. A char forming compound is a compound which forms char upon energy treatment. Generally, a char forming compound is of high carbon and oxygen content.

Examples of char forming compounds are carbohydrates such as monosaccharides, disaccharides and polysaccharides, and derivatives thereof, wherein the carbonyl group has been reduced to a hydroxyl group, so-called sugar alcohols.

Examples of monosaccharides are glucose, mannose, galactose, arabinose, fructose, ribose, erythrose and xylose. Examples of disaccharides are maltose, cellobiose, lactose and saccharose. Examples of polysaccharides are cellulose, starch, gum arabic, dextrin and cyclodextrin. Examples of sugar alcohols are meso-erythritol, sorbitol, mannitol and pentaerythritol.

In addition to these compounds, a malonate or a compound having the partial formula —CH(OH)CH(OH)CH(OH)COO⁻ as disclosed in WO 2006/129078 A1, for example a gluconate or a heptonate, may be used. Moreover, an alginate as disclosed in WO 2006/129086 A1, for example sodium alginate, may also be used.

Preferred char forming compounds are monosaccharides and disaccharides. More preferred char forming compounds are saccharose and galactose. The most preferred char forming compound is saccharose (to be referred to also as sucrose).

In addition, the coating composition may comprise other color change systems which may be based on other mechanisms.

The aqueous composition of the present invention comprises as solvent water and possibly an organic solvent. Most preferably, the solvent is only water.

Examples of organic solvents are $C_{1-4}$-alkanols, $C_{2-4}$-polyols, $C_{3-6}$-ketones, $C_{4-6}$-ethers, dimethylsulfoxide, N-methyl pyrolidone and sulfolane, wherein $C_{1-4}$-alkanols and $C_{2-4}$-polyols may be substituted with $C_{1-4}$-alkoxy. Examples of $C_{1-4}$-alkanols are methanol, ethanol, propanol, isopropanol or butanol, isobutanol, sec-butanol and tert-butanol. Examples of $C_{1-4}$-alkoxyderivatives thereof are 2-ethoxyethanol and 1-methoxy-2-propanol. Examples of $C_{2-4}$ polyols are glycol, propylene glycol and glycerol. Examples of $C_{3-6}$-ketones are acetone and methyl ethyl ketone. Examples of $C_{4-6}$-ethers are dimethoxyethane and diethyleneglycol dimethylether.

Preferred examples of organic solvents are $C_{1-4}$-alkanols, $C_{3-6}$-ketones, $C_{4-6}$-ethers, dimethylsulfoxide, N-methyl pyrolidone and sulfolane, wherein $C_{1-4}$-alkanols may be substituted with $C_{1-4}$-alkoxy.

Preferably, the organic solvent is selected from the group consisting of $C_{1-4}$-alkanols, $C_{2-4}$-polyols and $C_{3-6}$-ketones and wherein $C_{1-4}$-alkanols and $C_{2-4}$-polyols may be substituted by $C_{1-4}$-alkoxy.

More preferably, the organic solvent is selected from the group consisting of $C_{1-4}$-alkanols and $C_{3-6}$-ketones, wherein $C_{1-4}$-alkanols may be substituted by $C_{1-4}$-alkoxy.

The composition of the present invention also comprises a binder which comprises an acrylate binder, comprising acrylic acid and styrene, and at least one additional monomer selected from the group consisting of α-methyl styrene, ethyl acrylate and 2-ethylhexyl acrylate. "Comprising acrylic acid and styrene . . . " is to be understood here as comprising the repeating units derived from these monomers.

The acrylate binder used in accordance with the present invention comprises preferably from 1 to 10% by weight acrylic acid, and 20 to 75% by weight styrene, based upon the weight of the acrylate binder. If α-methyl styrene is used, it is preferably used in an amount of from 20 to 50% by weight of the acrylate binder.

The composition of the present invention may comprise additionally a polyvinyl alcohol binder. The polyvinyl alcohol binder includes acrylic polyvinyl alcohol, partially hydrolysed polyvinyl acetate, carboxy-modified polyvinyl alcohol, acetoacetyl-modified polyvinyl alcohol, diacetone-modified polyvinyl alcohol, silicon-modified polyvinyl alcohol and sulfonated-PVA, for example Gohseran L-3266 as manufactured by Nippon Gohsei.

The composition of the present invention may comprise other additional binders.

Examples of additional polymeric binders are other acrylic polymers, styrene polymers and hydrogenated products thereof, vinyl polymers and derivatives thereof, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders. It can also be a mixture of liquid monomers and a suitable photoinitiator that forms one of the above listed polymeric binders under UV irradiation after coating. In this case, the monomers function as the solvent.

Polyurethanes can be polymers formed from at least one diisocyanate monomer and at least one polyol monomer and/or polyamine monomer. Examples of diisocyanate monomers are hexamethylene diisocyanate, toluene diisocyanate, isophorone diisocyanate and diphenylmethane diisocyanate.

Acrylic polymers are polymers formed from at least one acrylic monomer or from at least one acrylic monomer and at least one other ethylenically unsaturated polymer such as a styrene monomer, vinyl monomer, olefin monomer or maleic monomer.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth)acrylate, substituted $C_{1-6}$-alkyl (meth)acrylates such as glycidyl methacrylate and acetoacetoxyethyl methacrylate, di($C_{1-4}$-alkylamino)$C_{1-6}$-alkyl (meth)acrylates such as dimethylaminoethyl acrylate or diethylaminoethyl acrylate, amides formed from $C_{1-6}$-alkylamines, substituted $C_{1-6}$-alkylamines such as 2-amino-2-methyl-1-propane sulfonic acid, ammonium salt, or di($C_{1-4}$-alkyl-amino)$C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide. Examples of acrylic polymers are poly(methyl methacrylate) and poly(butyl methacrylate), as well as carboxylated acrylic copolymers as sold for example by Ciba under the tradenames Ciba® Glascol® LE15, LS20 and LS24, styrene acrylic copolymers as sold for example by Ciba under the tradenames Ciba® Glascol® LS26 and Ciba® Glascol® C44, and polyacrylic acid polymers as sold for example by Ciba under the tradename Ciba® Glascol® E11, or by BASF S.E. under the trade name Joncryl®, such as Joncryl® 90, Joncryl® 678, Joncryl® 682.

Styrene polymers are polymers formed from at least one styrene monomer and at least one vinyl monomer, olefin monomer and/or maleic monomer. Examples of styrene polymers are styrene butadiene styrene block polymers, styrene ethylene butadiene block polymers, styrene ethylene propylene styrene block polymers and styrene-maleic anhydride copolymers.

Vinyl polymers are polymers formed from at least one vinyl monomer or from at least one vinyl monomer and at least one olefin monomer or maleic monomer. Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins are polymers formed from at least one olefin monomer or from at least one olefin monomer or maleic monomer. Examples of polyolefins are polyethylene, polypropylene, polybutadiene and isopropylene-maleic anhydride copolymer.

Aldehyde polymers are polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide. An example of an aldehyde polymer is polyvinyl butyral formed from butyral and polyvinylalcohol.

Epoxide polymers are polymers formed from at least one epoxide monomer and at least one alcohol monomer and/or amine monomer. Examples of epoxide monomers are epichlorhydrine and glycidol. Examples of alcohol monomers are phenol, cresol, resorcinol, xylenol, bisphenol A and glycol. An example of an epoxide polymer is phenoxy resin, which is formed from epichlorhydrin and bisphenol A.

Polyamides are polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalenedicarboxylic acid. Examples of polyamides are polyhexamethylene adipamide and polycaprolactam.

Polyesters are polymers formed from at least one monomer having a hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is caprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Examples of sulfone-based polymers are polyarylsulfone, polyethersulfone, polyphenyl-sulfone and polysulfone. Polysulfone is a polymer formed from 4,4'-dichlorodiphenyl sulfone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The polymeric binders are known in the art and can be produced by known methods, e.g. by polymerisation starting from suitable monomers. Preferably, the monomer mixture comprises ethylenically unsaturated monomers such as acrylic monomers, styrene monomers, vinyl monomer, olefin monomers or α,β-unsaturated carboxylic acid monomers.

Polymerisation of the monomer mixture can be achieved by addition of a suitable initiator. The initiator can be, for example, a peroxide, a persulfate, an azo compound, a redox couple or mixtures thereof. Examples of peroxides are hydrogen peroxide, tert-butyl peroxide, cumene hydroperoxide and benzoyl peroxide. Examples of persulfates are ammonium, sodium or potassium persulfate. Examples of azo compounds are 2,2-azobisisobutyronitrile and 4,4'-azobis(4-cyanovaleric acid). Examples of redox couples are tert-butylhydrogen-peroxide/sodium sulfite, sodium persulfate/sodium hydrogensulfite or sodium chlorate/sodium hydrogensulfite.

Preferably, the additional polymeric binder is selected from the group consisting of acrylic polymers, styrene polymers, vinyl polymers and derivatives thereof, polyolefins, polyurethanes and natural polymers and derivatives thereof.

More preferably, the polymeric binder is an acrylic polymer as sold for example by Ciba under the tradename Ciba® Glascol® such as Ciba® Glascol® LE15, LS26, E11 or C44. Ciba® Glascol® LS 26 is a core shell polymer consisting of 70 weight parts 55/45 (w/w) styrene/2-ethylhexyl acrylate copolymer, which functions as the core polymer, and 30 weight parts of styrene/acrylic acid copolymer, which functions as the shell polymer.

Suitable binders based on vinylacetate, butadiene, acrylic and styrene homo and copolymers are sold by Ciba® under the trade name LATEXIA®.

The aforementioned Glascol® binders and the Joncryl® binders, such as Joncryl® 90, Joncryl® 678, Joncryl® 682 as sold by BASF under the trade name Joncryl® are most preferred.

The laser sensitive composition of the present invention can comprise additional components. The additional components that may be included in the coating composition can be any component suitable for improving the performance of the composition. The additional component can be a component that can absorb the incident energy and transfer this energy to the system thermally or otherwise such as UV absorber or IR absorber. Examples of other types of additional components that improve the performance of the composition are catalysts (sometimes to be referred as activators), pigments, stabilizers, antioxidants, rheology modifiers, wetting agents, biocides, smoke suppressants, char forming compounds, plasticizers, waxes, adhesion promoters, anti-foam agents, surfactants, surface modifiers, pH adjusters and taggants. Taggants are various substances added to a product to indicate its source of manufacture.

An example of a UV absorber is 2-hydroxy-4-methoxybenzophenone.

IR absorbers can be organic or inorganic. Examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2.

Examples of inorganic IR absorbers are oxides, hydroxides, sulfides, sulfates and phosphates of metals such as copper, bismuth, iron, nickel, tin, zinc, manganese, zirconium and antimony, including antimony(V) oxide doped mica and tin(IV) oxide doped mica.

Catalysts are compounds that catalyse the reaction between the colour developer and the colour forming compound and thus increase the sensitivity.

Pigments can be added as inorganic IR absorbers, for enhanced contrast between unimaged and imaged areas or as a security feature.

Examples of pigments which function as inorganic IR absorbers are kaolin, calcined kaolin, mica, aluminium oxide, aluminium hydroxide, aluminium silicates, talc, amorphous silica and colloidal silicon dioxide.

Examples of pigments which can be added for enhanced contrast between an unimaged and an imaged area are titanium dioxide, calcium carbonate, kaolin, calcined kaolin, aluminium hydroxide, talc, zinc oxide, amorphous silica, barium sulfate, polystyrene resin, urea-formaldehyde resin, hollow plastic pigment and mixtures thereof.

Examples of pigments which can be added as a security feature are fluorescent pigments or magnetic pigments.

Examples of rheology modifiers are xanthan gum, methylcellulose, hydroxypropyl methylcellulose, or acrylic polymers such as sold under the tradenames Ciba® Rheovis® 112, Ciba® Rheovis® 132 and Ciba® Rheovis® 152.

An example of a wetting agent is Ciba® Irgaclear® D, a sorbitol based clarifying agent, acetylenic diols and derivatives sold under the tradename Surfynol® by Air Products.

Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which Metasol®TK 100, which includes 2-(4-thiazolyl)-benzimidazole.

An example of a smoke suppressant is ammonium octamolybdate.

The coatings formed by the coating compositions of the present invention can be coated with a laminate layer or overprint coating. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

The coating composition of the present invention preferably comprises 1 to 50%, preferably 1 to 40%, more preferably 1 to 20%, most preferably 1 to 10% by weight of the colour former, based on the weight of the total composition.

The coating composition of the present invention preferably comprises 1 to 80%, preferably 1 to 40%, more preferably 2 to 20% by weight of the developer, based on the weight of the total composition.

The coating composition of the present invention may preferably comprise also 0 to 30%, preferably 0 to 20%, more preferably 0 to 15%, most preferably 0 to 5% by weight of a second compound capable of forming a coloured substance upon exposition to energy, based on the weight of the total composition.

The composition of the present invention preferably comprises 10 to 95%, preferably 20 to 95%, more preferably 30 to 95% and most preferably 40 to 85% by weight of the solvent, based on the weight of the total composition.

The composition of the present invention preferably comprises 1 to 80%, preferably 1 to 60%, more preferably 5 to 60% and most preferably 10 to 50% by weight of the polymeric binder, based on the weight of the total composition.

The composition of the present invention can comprise 0 to 30%, preferably 0 to 20%, more preferably 0 to 10% and most preferably 0 to 5% by weight of additional components, based on the weight of the total composition.

The composition of the present invention thus preferably consists of 1 to 10% of the colour former, 2 to 20% by weight of the developer, 0 to 30% of a second compound capable of forming a coloured substance upon exposition to energy, 40 to 80% of the solvent, 10 to 50% of the polymeric binder, and 0 to 30% of additional components, all based on the weight of the total composition.

In a very preferred embodiment of the present invention, the coating composition comprises
1 to 10% by weight 3-dibutylamino-6-methyl-7-anilinofluoran (for example Pergascript® Black 2C), 2 to 20% by weight developer (in particular N-(p-toluenesulfonyl)-N'-3-(p-toluenesulfonyloxyphenyl)urea (for example Ciba® Pergafast® 201) or phenol, 4,4'-sulfonylbispolymer with 1,1'-oxobis(2-chloroethane),
and
10 to 50% by weight polymeric binder (in particular a core shell polymer wherein both the core and the shell comprise styrene acryl copolymers).

In preferred embodiments, this composition contains 0-10% by weight ammonium sulfate and 0-10% by weight diammonium hydrogenphosphate.

Optionally, this composition may preferably comprise 0.1 to 2% by weight Xanthan Gum thickener.

The invention is moreover directed to a process for preparing the composition of the present invention comprising a step of mixing a colour former and a developer in a weight ratio in the range of from 1 to 5; a binder comprising an acrylate binder, comprising acrylic acid and styrene; and/or a polyvinyl alcohol binder; and at least one additional monomer selected from the group consisting of α-methyl styrene, ethyl acrylate and 2-ethylhexyl acrylate; and wherein the colour former and/or the developer are present in an un-encapsulated form.

Also part of the invention is a substrate coated with the composition of the present invention.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. The substrate can also be a pharmaceutical tablet or foodstuff. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

In a preferred embodiment, the thickness of the coating is in the range of 0.1 to 1000 µm. More preferably, it is in the range of 1 to 500 µm. Even more preferably, it is in the range of 1 to 200 µm. Most preferably, it is in the range of 1 to 120 µm.

In an alternative preferred embodiment, the coat weight is in the range of from 0.5 to 20 g/m$^2$, more preferably within the range of from 1 to 12 g/m$^2$, and even more preferably in the range of from 1 to 5 g/m$^2$.

Another aspect of the present invention is a process for preparing a coated substrate, which comprises the step of coating a substrate with the composition of the present invention.

The substrate can be coated with the composition of the present invention by using a standard coating application such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The coating composition can be dried, for example at ambient or elevated temperature. An elevated temperature is ideally chosen to avoid image formation before exposure to the energy.

The formed coating layer can be top-coated with a laminate layer or overprint varnish, which reduces emission during the marking process. If the material of the laminate layer or the overprint varnish is selected so that it does not absorb at the wavelength of the imaging laser then the laser-sensitive coating layer can be imaged through the laminate layer without damaging or marking the laminate. Also the laminate or overprint varnish is ideally chosen that it does not result in colouration of the laser-sensitive coating layer before the energy treatment.

After coating the substrate, an adhesive could be applied to the coated or uncoated side of the substrate.

A marked substrate can be prepared by a process, which comprises the steps of i) providing a substrate coated with the composition of the present invention, and ii) exposing those parts of the coated substrate, where a marking is intended, to laser irradiation in order to generate a marking.

Usually, the coated side of the substrate of step i) is exposed to laser irradiation. However, if the substrate is transparent, also the uncoated side could be exposed to laser irradiation.

The laser irradiation can be ultraviolet, visible or infrared laser irradiation. Preferably, the laser irradiation is infrared laser irradiation.

The infrared laser irradiation can be produced by suitable lasers such as $CO_2$ lasers, Nd:YAG lasers and IR semiconductor lasers. Irradiation using a $CO_2$ laser at a wavelength of 10,600 nm is particularly preferred.

Typically the exact power of the IR laser and the marking speed is determined by the application and chosen to be sufficient to generate the marking.

Also part of the invention is a process for preparing a marked substrate, which comprises the steps of i) coating a substrate with the composition of the present invention, and ii) exposing those parts of the coated substrate, where a marking is intended, to energy in order to generate a marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV, visible or IR laser. Examples of IR lasers are $CO_2$ lasers, Nd:YAG (neodym-yttrium-aluminum garnet) lasers and IR semiconductor lasers.

Preferably, the energy is IR irradiation. More preferably, the energy is IR irradiation having a wavelength in the range of 780 to 1,000,000 nm. Even more preferably, the energy is IR irradiation generated by a $CO_2$ laser or a Nd:YAG laser. Most preferably, the energy is IR irradiation generated by a $CO_2$ laser having a wavelength of 10,600 nm.

Typically the exact power of the IR laser and the line speed is determined by the application and chosen to be sufficient to generate the image, for example, when the wavelength of the IR laser is 10,600 nm and the diameter of the laser beam is 0.35 mm, the power is typically 0.5 to 4 W, and the marking speed is typically 300 to 1,000 mm/s.

Yet another aspect of the invention is the marked substrate, which is obtained by the above process.

The compositions of the present invention have numerous advantages. The compositions of the invention have good storage stability and provide high transparency coatings that yield high contrast colored markings when irradiated by a laser. The compositions may be used as coatings or inks. When radiation energy is applied to coated substrates, high contrast markings are obtained while at the same time no visible smoke is generated. Moreover, the compositions of the present invention allow high loadings with color change active ingredients such that the application of these coatings for gravure and flexo printing is possible where a very low coat weight (2-3 g/m² dry) are applied.

The composition of the present invention has the advantage that transparent, high contrast coloured images of any desired colour can be produced with ease. In this regard, the coating composition of the present invention allows a tuning of the system by adjusting the amounts and types of all the components used in the compositions of the invention (e.g. the composition of the binder, auxiliaries etc.) to achieve maximum performance. Moreover, the compositions of the present invention exhibit good stability upon prolonged storage and/or at elevated temperatures.

EXAMPLES

Preparation of Coating Compositions

The compositions of the laser active coatings of Examples 1 to 30 are shown in Table 1. All compositions show Newtonian flow behaviour. The color of the compositions is slightly off-white for most of the examples.

Preparation of an Acrylic Binder (Binder A1)

To a 1 liter resin pot fitted with mechanical stirrer, condenser, nitrogen inlet, temperature probe and feed inlets are placed 98.9 g water and 483.9 g Joncryl® 8078 which is sold by BASF SE, a solution of an ammonium salt of a low molecular weight (ca. 8000 g/mol styrene acrylic copolymer. The contents are heated to 85° C. and degassed with nitrogen for 30 minutes. A monomer phase is prepared by mixing 192.5 g styrene with 157.5 g 2-ethylhexyl acrylate. An initiator feed is prepared by dissolving 1.97 g ammonium persulfate in 63.7 g water. When the reactor is at temperature and degassed, 0.66 g ammonium persulfate are added to the reactor. After 2 minutes, the monomer and initiator feeds are started appropriate to a 3 and 4 hour feed respectively. The reactor contents are maintained at 85° C. throughout the feeds. After completion of the feeds, the reactor contents are held for a further 1 hour at 85° C. before being cooled down to below 40° C. at which point 0.9 g Acticide LG, a biocide containing chlorinated and non-chlorinated methyl isothiazolones, is added. This results in an emulsion polymer of 49.2% solids, pH 8.3 and a Brookfield RVT viscosity of 1100 cPs.

Preparation of Aqueous Dispersion A (25% by Weight Color Former)

6 g 3-dibutylamino-6-methyl-7-anilinofluoran (Color former B2, for example Ciba® Pergascript® Black 2C), 12 g 10% solution of Poval 203 (partially hydrolysed PVA manufactured by Kuraray Co. Ltd.), 5.8 g of water and 0.18 g of 20% Surfynol® 104 (wetting agent manufactured by Air Products & Chemicals Inc.; solution in isopropyl alcohol) are mixed and milled to a mean particle size of about 1 micron.

Preparation of Aqueous Dispersion B (25% by Weight Color Developer)

6 g N-(p-toluenesulfonyl)-N'-3-(p-toluenesulfonyloxyphenyl)urea (developer D1; for example Ciba® Pergafast® 201), 4 g 10% solution of PVA (Poval 203), 13.6 g water and 0.40 g 45% solution Huntsman® Dehscofix®930 dispersant are mixed and milled to a mean particle size of about 1 micron.

Preparation of Aqueous Dispersion C (Developer)

The following ingredients were mixed and milled with 30.0 g of glass beads until a mean particle diameter of about 1 μm in order to obtain 24.0 g of aqueous Dispersion C:
12.0 g Pergafast® 201

1.25 g Joncryl® 678 (32 weight % aqueous solution; neutralised with ammonia)
0.40 g 45% solution Huntsman® Dehscofix®930 dispersant, and
10.35 g water Preparation of Aqueous Dispersion D (Color Former)

The following ingredients were mixed and milled with 30.0 g of glass beads until a mean particle diameter of about 1 μm in order to obtain 24.0 g of aqueous Dispersion D:
12.0 g Pergascript® Black 2C,
3.75 g Joncryl® 678 (32 weight % solution),
0.20 g Surfynol® 104 (20% in isopropyl alcohol), and
8.05 g water Example 1

Preparation of Coating Composition 2.85 g Dispersion A, 4.5 g Dispersion B, 8.85 g Binder A1, and 18.9 g water are mixed and stirred for 10 minutes to produce a white laser active coating dispersion with the composition shown in Table 1.

Examples 2 to 30

The compositions of Examples 2 to 7 were produced in the same manner as Example 1, except that different amounts of reactants were used to arrive at the compositions shown in Table 1. Laser active coating dispersions were obtained in each case.

The compositions of Examples 8 to 10 were produced in the same manner as Example 1, except that instead of 6 g N-(p-toluenesulfonyl)-N'-3-(p-toluenesulfonyloxyphenyl) urea the developer D-90 was used. Amounts of reactants were used to arrive at the compositions shown in Table 1. Laser active coating dispersions were obtained in each case.

The compositions of Examples 11 to 30 were produced in the same manner as Example 1, except that different developers, colour formers and binders were used in the required amounts to arrive at the compositions shown in Table 1. Laser active coating dispersions were obtained in each case.

Examples 30a to 30c

The compositions of Examples 30a to 30b are produced in the same manner as Example 1, except that different colour formers are used in the required amounts to arrive at the compositions shown in Table 1. Laser active coating dispersions are obtained in each case.

In Table 1, the following abbreviations are used:
3-diethylamino-6-methyl-7-anilinofluoran (Color former B1; for example Ciba® Pergascript® Black 1C).
3-dibutylamino-6-methyl-7-anilinofluoran (Color former B2; for example Ciba® Pergascript® Black 2C).
Ciba® Latexia® 319 (Binder A4) is a styrene butadiene lattice with solids content 50%, particle size 0.12 μm, glass transition temperature Tg 28° C. Ciba® Latexia® 318 (Binder A3) is a styrene butadiene lattice with solids content 50%, particle size 0.12 μm, glass transition temperature Tg 22° C. Ciba® Latexia® 302 (Binder A2) is a styrene butadiene lattice with solids content 50%, particle size 0.15 μm, and glass transition temperature Tg 10° C.).
3-(N-ethyl-N-p-tolylamino)-6-methyl-7-anilinofluoran (color former B4; for example Black ETAC manufactured by Yamada Chemical Co. Ltd.)

3-di-n-pentylamino-6-methyl-7-anilinofluoran (color former B5; for example Black 305 manufactured by Yamada Chemical Co. Ltd.)
3-(N-methyl-N-propylamino)-6-methyl-7-anilinofluoran (color former B6; for example Black PSD 300 manufactured by Nippon Soda)
3-(N-ethyl-N-isoamylamino)-6-methyl-7-anilinofluoran (Color former B7, sold under the tradename S 205 by Yamada Chemical Company)
Phenol, 4,4'-sulfonylbis-polymer with 1,1'-oxobis(2-chloroethane) (as sold for example under the tradename D90 by Nippon Soda) (developer D2)
Bisphenol A (developer D3)
4.4'hydroxy-bisphenol sulfone (developer D4)
4-hydroxybenzoate derivative of a polypentaerythritol compound with CAS number 378244-93-0 as sold for example by Asahi Denka Kogyo under the tradename K5 (developer D5)
4,4'-bis(p-toluenesulphonylaminocarbonylamino)diphenylmethane) (as sold for example under the tradename B-TUM) (developer D6)
Carbamic acid, N,N'-[sulfonylbis[4,1-phenyleneiminocarbonylimino(methylphenylene)]]bis-, C,C'-diphenyl ester (as sold by Asahi Denka Kogyo under the tradename UU) (developer D7)
Latexia® 302S (binder A2)
Latexia® 707 (binder A5)
Joncryl® 682 (binder A6)
Carboset GA2236 (binder A7)

Example 31

Preparation of an Ink (Ink B)

In order to obtain 100.0 g of the ink, the following components were mixed to obtain a white dispersion:
11.0 g Dispersion D
22.0 g Dispersion C
5.9 g ammonia neutralised Joncryl® 678
5.0 g Formapol FP383 wax (sold by Formulated Polymer Products Ltd.) suspended in 56.1 g
Joncryl® 90

This ink is then coated on a white board using K-bar 0 with a dry coat weight of 3 g/m² and imaged using a $CO_2$ IR laser (power 0.5 W/speed 1000 mm/sec) to yield a black image of high contrast without any formation of smoke.

This ink is also coated on Tambrite white board (manufactured by Stora Enso) using K-bar 1 with a dry coat weight of about 3 g/m². It is then imaged using a 10 W $CO_2$ laser with the settings intensity 40% and speed 8000 mm/sec to yield a black image of high contrast.

Example 32

Preparation of an Ink (Ink C)

Preparation of Aqueous Dispersion E (50% by Weight Color Former)
50 g 3-dibutylamino-6-methyl-7-anilinofluoran (Color former B2, for example Ciba® Pergascript® Black 2C), 25 g 10% solution of Mowiol 4-88 (partially hydrolysed PVA manufactured by Kuraray Co. Ltd.), 24.8 g of water and 0.2 g of Surfynol® 104 powder (wetting agent manufactured by Air Products & Chemicals Inc.) are mixed and milled to a mean particle size of about 1 micron.

Preparation of Aqueous Dispersion F (50% by Weight Color Developer)
50 g N-(p-toluenesulfonyl)-N'-3-(p-toluenesulfonyloxyphenyl)urea (developer D1; for example Ciba® Pergafast™ 201), 25 g 10% solution of PVA (Mowiol 4-88) and 25 g water are mixed and milled to a mean particle size of about 1 micron.

In order to obtain 100.0 g of the ink, the following components were mixed to obtain a white emulsion:
11.0 g Dispersion E
22.0 g Dispersion F
5.9 g 32% aqueous ammonia neutralised Joncryl® 678 solution
5.0 g Formapol FP383 Wax, sold by Formulated Polymer Products Ltd. suspended in 56.1 g
Joncryl® 90

This ink is then coated on a white board using K-bar 0 with a dry coat weight of 3 g/m². and imaged using a $CO_2$IR laser (power 0.5 W/speed/1000 mmsec) to yield a black image of high contrast, producing no smoke.

TABLE 1

| No | Color former content of active in % weight | Developer content of active in % weight | Binder % weight as is | Aspect formulation |
|---|---|---|---|---|
| 1 | 2.0 B2 | 3.2 D1 | 25 A1 | sl. off white emulsion |
| 2 | 2.0 B2 | 3.2 D1 | 5 A1 | sl. off white emulsion |
| 3 | 2.0 B2 | 2.0 D1 | 25 A1 | sl. off white emulsion |
| 4 | 2.0 B2 | 4.0 D1 | 25 A1 | sl. off white emulsion |
| 5 | 2.4 B2 | 4.8 D1 | 24 A1 | sl. off white emulsion |
| 6 | 2.7 B2 | 5.4 D1 | 23 A1 | sl. off white emulsion |
| 7 | 3.2 B2 | 6.4 D1 | 20 A1 | sl. off white emulsion |
| 8 | 2.0 B2 | 3.2 D2 | 25 A1 | sl. off white emulsion |
| 9 | 2.0 B2 | 2.0 D2 | 25 A1 | sl. off white emulsion |
| 10 | 2.0 B2 | 4.0 D2 | 25 A1 | sl. off white emulsion |
| 11 | 2.0 B2 | 3.2 D3 | 25 A1 | sl. grey emulsion |
| 12 | 2.0 B2 | 3.2 D4 | 25 A1 | sl. off white emulsion |
| 13 | 2.0 B2 | 3.2 D5 | 25 A1 | sl. grey emulsion |
| 14 | 2.7 B2 | 2.7 D6 | 25 A1 | trace grey emulsion |
| 15 | 2.7 B2 | 4.3 D6 | 25 A1 | trace grey emulsion |
| 16 | 2.7 B2 | 5.4 D6 | 25 A1 | trace grey emulsion |
| 17 | 2.7 B2 | 2.7 D7 | 25 A1 | sl. off white emulsion |
| 18 | 2.7 B2 | 4.3 D7 | 25 A1 | sl. off white emulsion |
| 19 | 2.7 B2 | 5.4 D7 | 25 A1 | sl. off white emulsion |
| 20 | 2.0 B2 | 3.2 D1 | 25 A3 | sl. off white emulsion |
| 21 | 2.0 B2 | 3.2 D1 | 5 A3 | sl. off white emulsion |
| 22 | 2.0 B2 | 3.2 D1 | 25 A4 | sl. off white emulsion |
| 23 | 2.0 B2 | 3.2 D1 | 5 A3 | sl. off white emulsion |
| 24 | 2.0 B2 | 3.2 D1 | 25 A2 | sl. off white emulsion |
| 25 | 2.0 B2 | 3.2 D1 | 25 A6 | sl. off white emulsion |

TABLE 1-continued

| No | Color former content of active in % weight | Developer content of active in % weight | Binder % weight as is | Aspect formulation |
|---|---|---|---|---|
| 26 | 2.0 B2 | 3.2 D1 | 25 A6 | sl. off white emulsion |
| 27 | 2.0 B1 | 3.2 D1 | 25 A1 | sl. off white emulsion |
| 28 | 2.0 B5 | 3.2 D1 | 25 A1 | sl. off white emulsion |
| 29 | 2.0 B4 | 3.2 D1 | 25 A1 | sl. off white emulsion |
| 30 | 2.0 B6 | 3.2 D1 | 25 A1 | Trace pink emulsion |
| 30a | 2.7 B7 | 5.4 D1 | 25.0 A1 | sl. off white emulsion |
| 30b | 1.35 B7 + 1.35 B2 | 5.4 D1 | 25.0 A1 | sl. off white emulsion |
| 30c | 5.4 B2 | 10.8 D1 | 25.0 A1 | sl. off white emulsion |

Example 33

Preparation of a White Ink

In order to obtain 50 g of the ink
10.0 g Tioxide R-XL (titanium dioxide manufactured by Huntsman) are mixed into
2.55 g Joncryl® 8078 and
1.55 g Formapol FP383 wax and
0.1 g Tego® Foamex 810 (manufactured by Evonik Tego Chemie GmbH) suspended in
16.5 g Joncryl® 90 and
2.5 g water to produce a white base ink.

To this base ink the following dispersions are added under stirring:
11.2 g Dispersion C and
5.6 g Dispersion D A trace off white laser active ink is obtained comprising laser active components.

The ink is coated on Tambrite white board (manufactured by Stora Enso) using K-bar 1 with a dry coat weight of about 3 g/m². It is then imaged using a 10 W $CO_2$ laser with the settings intensity 40% and speed 8000 mm/sec to yield a black image of high contrast.

Examples 34 to 39

The compositions of Examples 34 to 39 are produced in the same manner as Example 31, except that different combinations of developer dispersions and colour former dispersions are used in the required amounts to arrive at the compositions shown in Table 2. The amounts of the rest of the ingredients are the same as described in example 31. Stable laser active coating dispersions are obtained in each case.

The following additional abbreviations are used in Table 2:
2,4'-dihydroxydiphenylsulfone (Developer D8, purchased from ABCR GmbH)
1,1,3-Tri(3-tert-butyl-4-hydroxy-6-methylphenyl)butane (Developer D9 with antioxidant properties, purchased from Aceto Corp)

The above inks are coated on Tambrite white board (manufactured by Stora Enso) using K-bar 1 with a dry coat weight of about 3 g/m². They are then imaged using a 10 W $CO_2$ laser with the settings intensity 40% and speed 8000 mm/sec, except for Example 35 where the laser settings are intensity 20% and speed 4000 mm/sec. Black images of high contrast are produced.

TABLE 2

| No | Color former content of active in % weight | Developer content of active in % weight | Aspect formulation |
|---|---|---|---|
| 34 | 2.75 B7 + 2.75 B2 | 11.0 D1 | moderately grey emulsion |
| 35 | 5.5 B4 | 11.0 D1 | sl. off white emulsion |
| 36 | 5.5 B4 | 8.8 D8 + 2.2 D9 | sl. off white emulsion |
| 37 | 5.5 B4 | 11.0 D8 | sl. off white emulsion |
| 38 | 5.5 B4 | 8.8 D8 + 2.2 D9 | sl. off white emulsion |
| 39 | 5.5 B4 | 11.0 D8 | sl. off white emulsion |

Formulation Stability

The compositions of all Examples are stable. Any settling which might occur upon prolonged storage can be easily overcome by the use of a thickening agent, e.g. xanthan gum, or by increasing the amount of highly viscous binders such as Joncryl® or Poval 203. Settling of inks is well known and accepted and is normally remedied by simply stirring before use. The compositions described herein, in particular compositions based on 3-dibutylamino-6-methyl-7-anilinofluoran (for example Ciba® Pergascript® Black 2C) and 3-(N-ethyl-N-p-tolylamino)-6-methyl-7-anilinofluoran (as sold for example under the tradename ETAC by Yamada Chemical Company) do not show discoloration after storage for 1 month at 40° C. and the marking performance of the coated substrates is comparable to the one before storage.

COMPARATIVE EXAMPLES

Comparative Example C1

Research Disclosure IPCOM000166609D

Example 3 of the above research disclosure was repeated. When using a mean particle size of 1.0 µm for both the color former dispersion and the developer dispersion (as e.g. used for Example 31 of this invention) a thick ink, not suitable for coating, is obtained. The experiment was repeated using a mean particle size of 1.5 µm, whereby a relatively thick but coatable ink is obtained The composition is as follows:
30 g 3-dibutylamino-6-methyl-7-anilinofluoran (color former B2)
60 g N-(p-toluene-sulfonyl)-N'-3-(p-toluenesulfonyloxyphenyl)urea (developer D1)
180 g of a 49% weight acrylic copolymer emulsion Carboset® GA-2236 (binder A7)
30 g water A dried coating of the above ink has the following composition regarding the actives:

Color former B2: 16.8%

Developer D1: 33.7%

Binder A7: 49.5%

Comparative Example C2

Example 31 of this Invention Reengineered to Comply with Comparative Example C1 in the Ratio of Binder to Color Forming Actives Example 31 of this invention was reformulated to obtain an ink with a similar ratio of binders to color forming actives. The mean particle size of Dispersions D and C was however changed to 1.5 μm to comply with Comparative Example C1. A well coatable ink, slightly thinner compared to Comparative Example C1 is obtained. Using a particle size of 1.0 μm for both dispersions also provides a well coatable ink. The ink with dispersions of a particle size of 1.5 μm was used for the application comparison with Comparative Example C2.

The composition is as follows:
g Dispersion D (color former B2)
120 g Dispersion C (developer D1)
32.2 g Joncryl® 678 (32% weight aqueous solution, neutralized with ammonia)
165.7 g Joncryl® 90 (44% aqueous solution)
27.3 g Formapol FP383 Wax (20% aqueous solution)
A dried coating of the above ink has the following composition regarding the actives:
  Color former B2: 16.3%
  Developer D1: 32.7%
  Joncryl® 678 8.3% (incl. the amounts used for the dispersions)
  Joncryl® 90 39.7%
  Formapol FP383 Wax 3.0%
The total amount of binder (without wax) is 48.0%.

Application of the Coating Compositions on Paper and Polymer Film as Substrates

Evaluation of Coated Substrates

The coated substrates prepared according to the invention are evaluated as described below. The results of the evaluations are summarized in Tables 3 to 6.

The coating compositions of the above Examples 1-30c and 31 are applied by coating bars of adequate dimensions adjusted to the viscosity of the samples onto Xerox paper (coated "Cento Copy" paper purchased from M-Real, Biberist, Switzerland) respectively polyester film as substrates. After drying, transparent coatings are obtained with coat weights in the range of 3-10 g/m². The coatings are then imaged using a $CO_2$ IR laser (wavelength: 10,600 nm, power: 0.5-4 W, diameter of laser beam: 0.35 mm, marking speed 300-1000 mm/s) to yield black high contrast markings. With energy and marking speed fine tuned according to the nature of the image, well readable images are achieved without producing smoke: e.g. a coating of coat weight 5 g/m² on Xerox paper with Example 6 produces no smoke when writing text with the laser energy set at 1 W and the marking speed at 1000 mm/sec, or when writing black circles of 1 cm in diameter by using 0.5 W energy at a marking speed of 1000 m/sec.

The compositions of Examples 31-39 are applied as described in their corresponding description. Imaging of the Examples 31 and 33-39 is carried out with a different $CO_2$ IR laser (wavelength: 10,600 nm, nominal power 10 W, lense with focal length 150 mm, settings for intensity and speed as indicated in the Examples). Black images of high contrast are achieved without producing smoke.

The results of background stability and image stability for Examples 31 and 33-39 are depicted in Tables 5 resp. 6.

Applications on polyester and polypropylene films show similarly good marking results.

Evaluation of Image and Background Stability

Image and background stability results for selected coated Xerox papers are listed in Tables 3 and 4. Selected coating compositions, a. freshly produced and b. after 28 days storage at 40° C., are coated on Xerox paper and imaged. Image and background stability testing is carried out as outlined below.

The results of background stability and image stability for Examples 31 and 33-39 are depicted in Tables 5 resp. 6.

Image Optical Density

The images are produced with the laser marking device described above using the settings 1 W for the energy and 1000 mm/sec for the line speed. The optical density (o.d.) of the image is measured with a Spectroeye densitometer from Gretag-Macbeth.

Background Stability

The optical density (OD) of the unrecorded portion of the coated substrate is measured with a Spectroeye densitometer from Gretag-Macbeth.

Heat Resistance

After printing, the coated substrate is stored for 24 hours in an oven maintained at 60° C. The optical densities of the recorded and unrecorded portions are then measured with a Spectroeye densitometer from Gretag-Macbeth.

Heat/Humidity Resistance

After printing, the coated substrate is stored for 24 hours in an oven maintained at 40° C. and 90% relative humidity. The optical densities of the recorded and unrecorded portions are then measured with a Spectroeye densitometer from Gretag-Macbeth.

Light Resistance

After printing, the coated substrate is stored for 18 hours in a xenon weatherometer (Atlas Suntester CPS+, 250 W/m²). The optical densities of the recorded and unrecorded portions are then measured with a Spectroeye densitometer from Gretag-Macbeth.

Oil Resistance

After printing, the coated substrate is gravure printed with cottonseed oil and then stored for 24 hours in an oven maintained at 40° C. The optical density of the recorded portion is then measured with a Spectroeye densitometer from Gretag-Macbeth.

TABLE 3

Background stability

| Example No. | Before exposure CIE white | 1 h@80° C. CIE white | 24 h@40° C./ 90% RH CIE white | 24 h@60° C. CIE white | xenon light 18 h@ 250 W/m² CIE white | 24 h 40° C. cottonseed oil CIE white |
|---|---|---|---|---|---|---|
| 2[1)] | 114.82 | 109.78 | 111.55 | 105.48 | 43.72 | 106.42 |
| 2[2)] | 115.12 | 105.71 | 111.86 | 103.17 | 42.52 | 106.77 |
| 8[1)] | 114.93 | 112.31 | 115.41 | 107.73 | 42.06 | 107.98 |
| 8[2)] | 113.70 | 110.73 | 111.90 | 107.73 | 49.40 | 104.01 |
| 13[1)] | — | — | — | — | — | — |
| 13[2)] | 105.26 | 101.37 | 102.70 | 98.20 | 43.51 | 93.64 |
| 18[1)] | 123.31 | 121.41 | 121.04 | 117.43 | 36.45 | 119.74 |
| 18[2)] | 119.03 | 115.79 | 116.50 | 110.16 | 32.43 | 114.23 |

[1)] fresh dispersion
[2)] dispersion after 28 d storage at 40°

TABLE 4

Image stability

| | 1 h@80° C. | | 24 h@40° C./ 90% RH | | 24 h@60° C. | | cottonseed oil resistance 24 h@40° C. | | xenon light 18 h@ 250 W/m² | |
|---|---|---|---|---|---|---|---|---|---|---|
| Example No. | Initial Density | After exposure | Initial density | After exposure | Initial density | After exposure | Initial density | After exposure | Initial density | After exposure |
| 2[1)] | 1.04 | 0.99 | 1.03 | 1.04 | 1.02 | 1.01 | 1.00 | 0.99 | 1.04 | 0.94 |
| 2[2)] | 1.03 | 1.03 | 1.04 | 1.07 | 1.02 | 1.02 | 1.04 | 1.02 | 1.04 | 0.93 |
| 8[1)] | 0.85 | 0.85 | 0.86 | 0.88 | 0.89 | 0.90 | 0.88 | 0.86 | 0.86 | 0.77 |
| 8[2)] | 0.75 | 0.76 | 0.74 | 0.78 | 0.75 | 0.77 | 0.76 | 0.74 | 0.74 | 0.66 |
| 13[1)] | — | — | — | — | — | — | — | — | — | — |
| 13[2)] | 0.74 | 0.75 | 0.75 | 0.76 | 0.73 | 0.74 | 0.75 | 0.70 | 0.75 | 0.75 |
| 18[1)] | 0.65 | 0.66 | 0.63 | 0.65 | 0.64 | 0.64 | 0.64 | 0.66 | 0.63 | 0.56 |
| 18[2)] | 0.62 | 0.64 | 0.61 | 0.64 | 0.61 | 0.62 | 0.60 | 0.62 | 0.60 | 0.56 |

[1)] fresh dispersion
[2)] dispersion after 28 d storage at 40°

TABLE 5

Background stability

| Example No. | Before exposure CIE white | 1 h@ 80° C. CIE white | 24 h@ 40° C./ 90% RH CIE white | 24 h@ 60° C. CIE white | xenon light 18 h@ 250 W/m² CIE white |
|---|---|---|---|---|---|
| 31 | 84.51 | 70.98 | 80.60 | 73.89 | 32.30 |
| 33 | 79.90 | 75.68 | 79.09 | 74.54 | 63.81 |
| 34 | 71.90 | 70.03 | 75.67 | 65.38 | 30.00 |
| 35 | 91.34 | 86.02 | 87.74 | 85.75 | 56.27 |
| 36 | 91.68 | 89.51 | 87.90 | 86.32 | 56.39 |
| 37 | 91.77 | 90.34 | 88.37 | 88.37 | 55.92 |
| 38 | 88.17 | 82.68 | 87.68 | 80.89 | 41.80 |
| 39 | 88.85 | 84.29 | 87.54 | 82.10 | 40.74 |

TABLE 6

Image stability

| | 1 h@80° C. | | 24 h@40° C./ 90% RH | | 24 h@60° C. | | cottonseed oil resistance 24 h@40° C. | | xenon light 18 h@ 250 W/m² | |
|---|---|---|---|---|---|---|---|---|---|---|
| Example No. | Initial Density | After exposure | Initial density | After exposure | Initial density | After exposure | Initial density | After exposure | Initial density | After exposure |
| 31 | 0.54 | 0.52 | 0.62 | 0.66 | 0.64 | 0.64 | 0.62 | 0.67 | 0.60 | 0.54 |
| 33 | 0.93 | 0.92 | 0.94 | 0.94 | 0.91 | 0.90 | 0.92 | 0.91 | 0.91 | 0.82 |
| 34 | 0.84 | 0.84 | 0.81 | 0.86 | 0.86 | 0.85 | 0.78 | 0.76 | 0.78 | 0.71 |
| 35 | 0.45 | 0.47 | 0.39 | 0.42 | 0.47 | 0.46 | 0.47 | 0.45 | 0.55 | 0.45 |
| 36 | 0.63 | 0.60 | 0.65 | 0.64 | 0.63 | 0.57 | 0.60 | 0.27 | 0.61 | 0.49 |
| 37 | 0.65 | 0.63 | 0.66 | 0.55 | 0.60 | 0.50 | 0.66 | 0.34 | 0.67 | 0.54 |

TABLE 6-continued

| | Image stability | | | | | | | | | |
|---|---|---|---|---|---|---|---|---|---|---|
| | 1 h@80° C. | | 24 h@40° C./ 90% RH | | 24 h@60° C. | | cottonseed oil resistance 24 h@40° C. | | xenon light 18 h@ 250 W/m² | |
| Example No. | Initial Density | After exposure | Initial density | After exposure | Initial density | After exposure | Initial density | After exposure | Initial density | After exposure |
| 38 | 0.94 | 0.92 | 0.76 | 0.76 | 0.88 | 0.82 | 0.76 | 0.46 | 0.80 | 0.68 |
| 39 | 0.81 | 0.82 | 0.88 | 0.83 | 0.82 | 0.72 | 0.80 | 0.54 | 0.96 | 0.74 |

Application of the Comparative Examples

Both Comparative Examples are coated on Tambrite white board using K-bar 1 to produce a dry coat weight of about 3 g/m². They are imaged using a 10 W $CO_2$ laser with the settings intensity 40% and speed 8000 mm/sec and intensity 60%; speed 10000 mm/sec to yield a black image of high contrast. Image and background stability are measured. The results of background stability and image stability, respectively, are summarized in Tables 7 and 8.

TABLE 7

| | Background stability | | | | |
|---|---|---|---|---|---|
| Comparative Example No. | Before exposure CIE white | 1 h@ 80° C. CIE white | 24 h@ 40° C./ 90% RH CIE white | 24 h@ 60° C. CIE white | xenon light 18 h@ 250 W/m² CIE white |
| C1 | 88.94 | 80.17 | 85.96 | 76.20 | 47.26 |
| C2 | 86.72 | 83.58 | 85.80 | 81.95 | 37.03 |

TABLE 8

| | Image stability | | | | | | | | | |
|---|---|---|---|---|---|---|---|---|---|---|
| | 1 h@80° C. | | 24 h@40° C./ 90% RH | | 24 h@60° C. | | cottonseed oil resistance 24 h@40° C. | | xenon light 18 h@ 250 W/m² | |
| Example No. | Initial Density | After exposure | Initial density | After exposure | Initial density | After exposure | Initial density | After exposure | Initial density | After exposure |
| C1[1)] | 1.04 | 0.95 | 1.15 | 0.94 | 1.04 | 0.94 | 0.91 | 0.84 | 1.00 | 0.84 |
| C1[2)] | 1.10 | 0.96 | 1.21 | 0.98 | 1.06 | 0.92 | 0.92 | 0.80 | 1.27 | 1.08 |
| C2[1)] | 0.86 | 0.88 | 0.83 | 0.87 | 0.82 | 0.80 | 0.82 | 0.76 | 0.91 | 0.78 |
| C2[2)] | 0.87 | 0.88 | 0.88 | 0.93 | 0.93 | 0.91 | 0.84 | 0.80 | 1.00 | 0.84 |

[1)]laser settings: intensity 40%; speed 8000 mm/sec
[2)]laser settings: intensity 60%; speed 4000 mm/sec As can be seen from Tables 7 and 8, the overall performance of the Comparative Example C2 with a binder system according to this invention is better compared to the binder system used in Comparative Example C1. Background stability is distinctly better for Comparative Example C2 under hot storage conditions. Only light fastness expressed in % CIE whiteness remaining after exposure is slightly worse (42.7% versus 53.5%). Image stability is better for Comparative Example C2 under hot storage conditions and light fastness is comparable expressed in % image remaining after exposure (86% versus 84% resp. 84% versus 85%), depending on the laser settings used.

The invention claimed is:

1. An aqueous composition comprising a color former, a developer, and a binder, wherein (a) the weight ratio between the developer and the color former is in the range of from 1:1 to 5:1;
(b) the binder comprises an acrylate binder, comprising acrylic acid and styrene, and at least one additional monomer selected from the group consisting of α-methyl styrene, ethyl acrylate and 2-ethylhexyl acrylate; and
(c) at least one of the color former and the developer is present in an un-encapsulated form,
wherein the developer is a sulfonylurea derivative of the formula:

$$R_1-S(O)_2-NH-X-NH-A-B-R_2 \quad (1),$$

wherein $R_1$ is unsubstituted or substituted phenyl, naphthyl or $C_{1-20}$-alkyl, X is a group of the formula —C(NH)—, —C(O)— or —C(S)—, A is unsubstituted or substituted phenylene, naphthylene or $C_{1-12}$-alkylene, or is an unsubstituted or substituted heterocyclic group, B is a linking group of formula —O—$SO_2$—, —$SO_2$—O—, —NH—$SO_2$—, —$SO_2$—NH—, —S—$SO_2$—, —O—CO—, —O—CO—NH—, —NH—CO—, —NH—CO—O—, —S—CO—NH—, —S—CS—NH—, —CO—NH—$SO_2$—, —O—CO—NH—$SO_2$—, —NH=CH—, —CO—NH—CO—, —S—, —CO—, —O—, —$SO_2$—NH—CO—, —O—CO—O— and —O—PO—$(OR_2)_2$, and $R_2$ is unsubstituted or substituted aryl or benzyl or $C_{1-20}$-alkyl, wherein if B is not a linking group of formula —O—$SO_2$—, $R_2$ is unsubstituted or substituted phenyl, naphthyl or $C_{1-8}$-alkyl, and wherein if B is —O—, $R_2$ is not alkyl.

2. The composition according to claim 1, wherein the color former is a fluoran.

3. The composition according to claim 2, wherein the fluoran is at least one selected from the group consisting of 3-dibutylamino-6-methyl-7-anilinofluoran, 3-diethylamino-6-methyl-7-anilinofluoran, 3-(N-ethyl-N-isoamylamino)-6-methyl-7-anilinofluoran, 3-dipentylamino-6-methyl-7-anilinofluoran, and 3-(N-ethyl-N-p-tolylamino)-6-methyl-7-anilinofluoran.

4. A substrate coated with the composition of claim 2.

5. A process for preparing a coated substrate, which comprises the step of coating a substrate with the composition of claim 2.

6. A process for preparing a marked substrate, which comprises the steps of i) coating a substrate with the composition of claim 2, and ii) exposing those parts of the coated substrate, where a marking is intended, to energy in order to generate a marking.

7. The composition according to claim 1, wherein the weight ratio between the developer and the color former is in the range of from 1.5:1 to 3:1.

8. A process for preparing the composition of claim 1, which comprises the step of mixing a color former and a developer in a weight ratio in the range of from 1:1 to 5:1; a binder comprising an acrylate binder, comprising acrylic acid and styrene, and at least one additional monomer selected from the group consisting of α-methyl styrene, ethyl acrylate and 2-ethylhexyl acrylate; and wherein at least one of the color former and the developer are present in an un-encapsulated form.

9. A substrate coated with the composition of claim 1.

10. A process for preparing a coated substrate, which comprises the step of coating a substrate with the composition of claim 1.

11. A process for preparing a marked substrate, which comprises the steps of i) coating a substrate with the composition of claim 1, and ii) exposing those parts of the coated substrate, where a marking is intended, to energy in order to generate a marking.

12. The process of claim 11, wherein the energy is selected from the group consisting of UV, IR, visible and microwave irradiation.

13. A marked substrate, which is obtained by the process of claim 11.

14. The composition according to claim 1, wherein $R_1$ as phenyl or naphthyl is unsubstituted or substituted by $C_{1-8}$-alkyl, $C_{1-8}$-alkoxy or halogen, and wherein $R_1$ as $C_{1-20}$-alkyl is unsubstituted or substituted by $C_{1-8}$-alkoxy or halogen.

15. The composition according to claim 1, wherein A as a phenylene or naphthylene group is unsubstituted or substituted by $C_{1-8}$-alkyl, halogen-substituted $C_{1-8}$-alkyl, $C_{1-8}$-alkoxy-substituted $C_{1-8}$-alkyl, $C_{1-8}$-alkoxy, halogen-substituted $C_{1-8}$-alkoxy, $C_{1-8}$-alkylsulphonyl, halogen, phenyl, phenoxy or phenoxycarbonyl.

16. The composition according to claim 1, wherein $R_2$ as aryl is phenyl or naphthyl which is unsubstituted or substituted by $C_{1-8}$-alkyl, halogen-substituted $C_{1-8}$-alkyl, $C_{1-8}$-alkoxy-substituted $C_{1-8}$-alkyl, $C_{1-8}$-alkoxy, halogen-substituted $C_{1-8}$-alkoxy or halogen, wherein $R_2$ as benzyl is unsubstituted or substituted by the substituents given for $R_2$ as phenyl or naphthyl, and wherein $R_2$ as $C_{1-20}$-alkyl is unsubstituted or substituted by $C_{1-8}$-alkoxy, halogen, phenyl or naphthyl.

17. The composition according to claim 1, wherein the developer is N-(p-toluenesulfonyl)-N'-3-(p-toluenesulfonyloxyphenyl)urea.

18. An aqueous composition comprising a color former, a developer, and a binder, wherein
  (a) the weight ratio between the developer and the color former is in the range of from 1:1 to 5:1;
  (b) the binder comprises an acrylate binder, comprising acrylic acid and styrene, and at least one additional monomer selected from the group consisting of α-methyl styrene, ethyl acrylate and 2-ethylhexyl acrylate; and
  (c) at least one of the color former and the developer is present in an un-encapsulated form, and
  wherein the developer is selected from at least one of, 4,4'-bis(p-toluenesulphonylaminocarbonylamino)diphenylmethane), 4-hydroxybenzoate derivative of a polypentaerythritol compound with CAS number 378244-93-0, N,N'-[sulfonylbis[4,1-phenylene iminocarbonylimino(methylphenylene)]]bis-,C,C'-diphenyl ester, $ZnCl_2$, octylammonium stearate, and ammonium stearate.

19. A process for preparing the composition of claim 18, which comprises the step of mixing a color former and a developer in a weight ratio in the range of from 1:1 to 5:1; a binder comprising an acrylate binder, comprising acrylic acid and styrene, and at least one additional monomer selected from the group consisting of α-methyl styrene, ethyl acrylate and 2-ethylhexyl acrylate; and wherein at least one of the color former and the developer are present in an un-encapsulated form.

20. A substrate coated with the composition of claim 18.

21. A process for preparing a coated substrate, which comprises the step of coating a substrate with the composition of claim 18.

22. A process for preparing a marked substrate, which comprises the steps of i) coating a substrate with the composition of claim 18, and ii) exposing those parts of the coated substrate, where a marking is intended, to energy in order to generate a marking.

23. The process of claim 22, wherein the energy is selected from the group consisting of UV, IR, visible and microwave irradiation.

24. A marked substrate, which is obtained by the process of claim 22.

* * * * *